US009843727B2

(12) United States Patent
Mishio et al.

(10) Patent No.: US 9,843,727 B2
(45) Date of Patent: Dec. 12, 2017

(54) IMAGE CAPTURING APPARATUS AND IMAGE CAPTURING METHOD

(71) Applicant: Olympus Corporation, Shibuya-ku, Tokyo (JP)

(72) Inventors: Yuki Mishio, Hino (JP); Tomotaka Sawada, Hachioji (JP); Tatsuro Masugi, Akiruno (JP); Nozomu Shiotani, Tokyo (JP); Mitsuaki Kashimata, Sakado (JP); Takahiro Terakado, Tokyo (JP); Naoya Murakami, Hachioji (JP)

(73) Assignee: Olympus Corporation, Tokyo (JP)

( * ) Notice: Subject to any disclaimer, the term of this patent is extended or adjusted under 35 U.S.C. 154(b) by 14 days.

(21) Appl. No.: 14/933,682

(22) Filed: Nov. 5, 2015

(65) Prior Publication Data

US 2016/0065863 A1 Mar. 3, 2016

Related U.S. Application Data

(63) Continuation of application No. PCT/JP2014/063624, filed on May 22, 2014.

(30) Foreign Application Priority Data

May 28, 2013 (JP) .................................. 2013-111775
Aug. 1, 2013 (JP) .................................. 2013-160584
(Continued)

(51) Int. Cl.
*H04N 5/232* (2006.01)
*H04N 5/225* (2006.01)
(Continued)

(52) U.S. Cl.
CPC ........... *H04N 5/23245* (2013.01); *G03B 7/00* (2013.01); *G03B 37/00* (2013.01); *G03B 37/06* (2013.01);
(Continued)

(58) Field of Classification Search
None
See application file for complete search history.

(56) References Cited

U.S. PATENT DOCUMENTS

2012/0023459 A1 1/2012 Westerman
2013/0328819 A1 12/2013 Miyano
(Continued)

FOREIGN PATENT DOCUMENTS

JP   H07-64158    3/1995
JP   2004-340991  12/2004
(Continued)

OTHER PUBLICATIONS

International Search Report to International Application No. PCT/JP2014/063624, dated Aug. 26, 2014 (5 pgs.), with translation (4 pgs.).
(Continued)

*Primary Examiner* — Shahbaz Nazrul
(74) *Attorney, Agent, or Firm* — John C. Pokotylo; Pokotylo Patent Services

(57) ABSTRACT

An image capturing apparatus includes an optical system, an image capturing unit, a posture detection unit, and a control unit. The optical system forms an image of a light beam from an object. The image capturing unit obtains image data corresponding to the light beam by the optical system. The posture detection unit detects a posture of the image capturing apparatus. The control unit determines based on the posture whether the image capturing apparatus is in a mode to perform shooting in a state in which an optical axis of the
(Continued)

optical system faces a zenith or in a mode to perform shooting in a state in which the optical axis of the optical system faces a photographer side. The control unit changes control in a shooting operation using the image capturing unit in accordance with a result of the determination.

12 Claims, 40 Drawing Sheets

(30) Foreign Application Priority Data

Aug. 2, 2013 (JP) .................................. 2013-161533
Aug. 2, 2013 (JP) .................................. 2013-161534

(51) Int. Cl.
<table>
<tr><td>H04N 5/77</td><td>(2006.01)</td></tr>
<tr><td>H04N 5/907</td><td>(2006.01)</td></tr>
<tr><td>G03B 7/00</td><td>(2014.01)</td></tr>
<tr><td>H04N 5/262</td><td>(2006.01)</td></tr>
<tr><td>G03B 37/00</td><td>(2006.01)</td></tr>
<tr><td>G03B 37/06</td><td>(2006.01)</td></tr>
<tr><td>G03B 17/02</td><td>(2006.01)</td></tr>
</table>

(52) U.S. Cl.
CPC ........... *H04N 5/225* (2013.01); *H04N 5/2253* (2013.01); *H04N 5/2254* (2013.01); *H04N 5/23216* (2013.01); *H04N 5/23222* (2013.01); *H04N 5/23238* (2013.01); *H04N 5/23293* (2013.01); *H04N 5/2628* (2013.01); *H04N 5/772* (2013.01); *H04N 5/907* (2013.01); *G03B 17/02* (2013.01)

(56) References Cited

U.S. PATENT DOCUMENTS

2014/0115536 A1 4/2014 Akiya
2015/0116232 A1 4/2015 Hayakawa

FOREIGN PATENT DOCUMENTS

<table>
<tr><td>JP</td><td>2004-364067</td><td>12/2004</td></tr>
<tr><td>JP</td><td>2006-222837</td><td>8/2006</td></tr>
<tr><td>JP</td><td>2006-279739</td><td>10/2006</td></tr>
<tr><td>JP</td><td>2007-187970</td><td>7/2007</td></tr>
<tr><td>JP</td><td>2007-259164</td><td>10/2007</td></tr>
<tr><td>JP</td><td>2007-300353</td><td>11/2007</td></tr>
<tr><td>JP</td><td>2009-15313</td><td>1/2009</td></tr>
<tr><td>JP</td><td>2011-55246</td><td>3/2011</td></tr>
<tr><td>JP</td><td>2012-22108</td><td>2/2012</td></tr>
<tr><td>JP</td><td>2012-133745</td><td>7/2012</td></tr>
<tr><td>JP</td><td>2012-173904</td><td>9/2012</td></tr>
<tr><td>JP</td><td>2012-199888</td><td>10/2012</td></tr>
<tr><td>JP</td><td>2012-209626</td><td>10/2012</td></tr>
<tr><td>JP</td><td>2013-8196</td><td>1/2013</td></tr>
<tr><td>JP</td><td>2013-041629</td><td>2/2013</td></tr>
<tr><td>JP</td><td>2013-078075</td><td>4/2013</td></tr>
<tr><td>JP</td><td>2013-145944</td><td>7/2013</td></tr>
<tr><td>WO</td><td>WO 2012-176384</td><td>12/2012</td></tr>
<tr><td>WO</td><td>WO 2013-061658</td><td>5/2013</td></tr>
</table>

OTHER PUBLICATIONS

First Office Action from corresponding Japanese Patent Application No. 2013-111755, dated Jan. 10, 2017 (4 pgs.), with translation (4 pgs.).
First Office Action from corresponding Japanese Patent Application No. 2013-160584, dated Jan. 24, 2017 (5 pgs.), with translation (5 pgs.).
Translation of International Preliminary Report on Patentability and Written Opinion of the International Searching Authority to International Application No. PCT/JP2014/063624, dated Dec. 1, 2015 (14 pgs.).

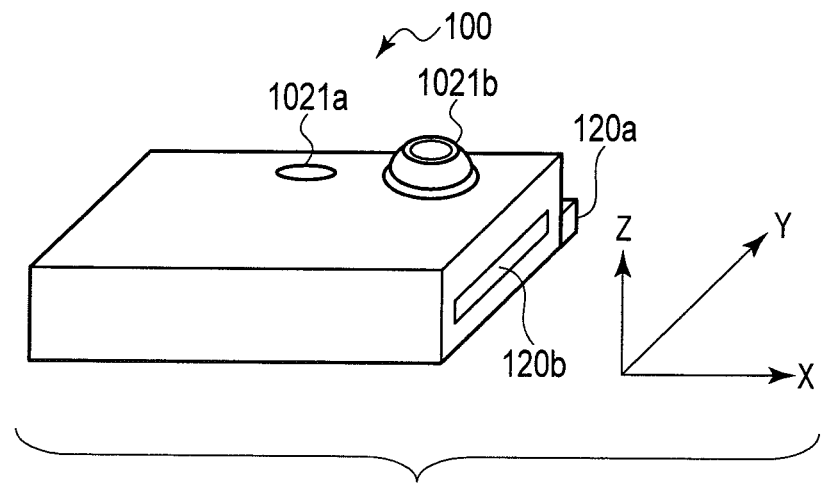
F I G. 3A
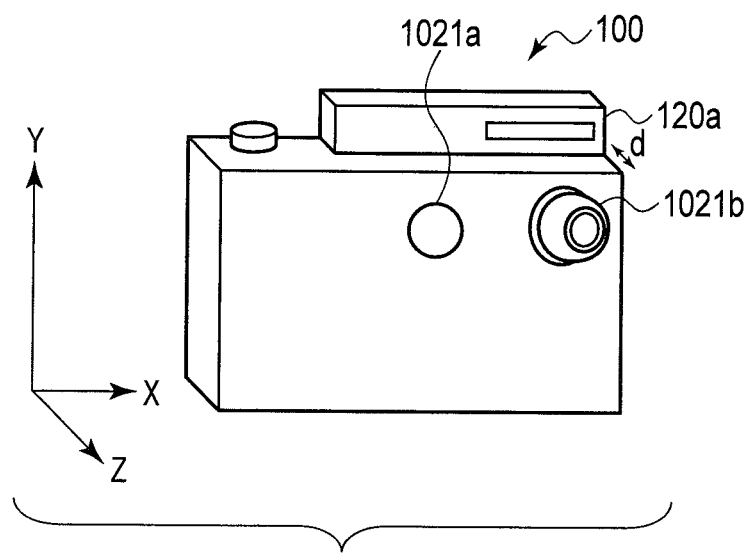
F I G. 3B

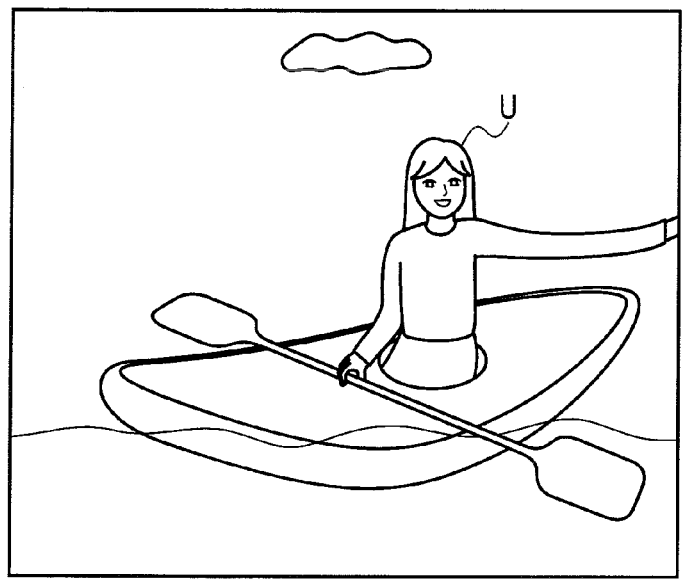
F I G. 9
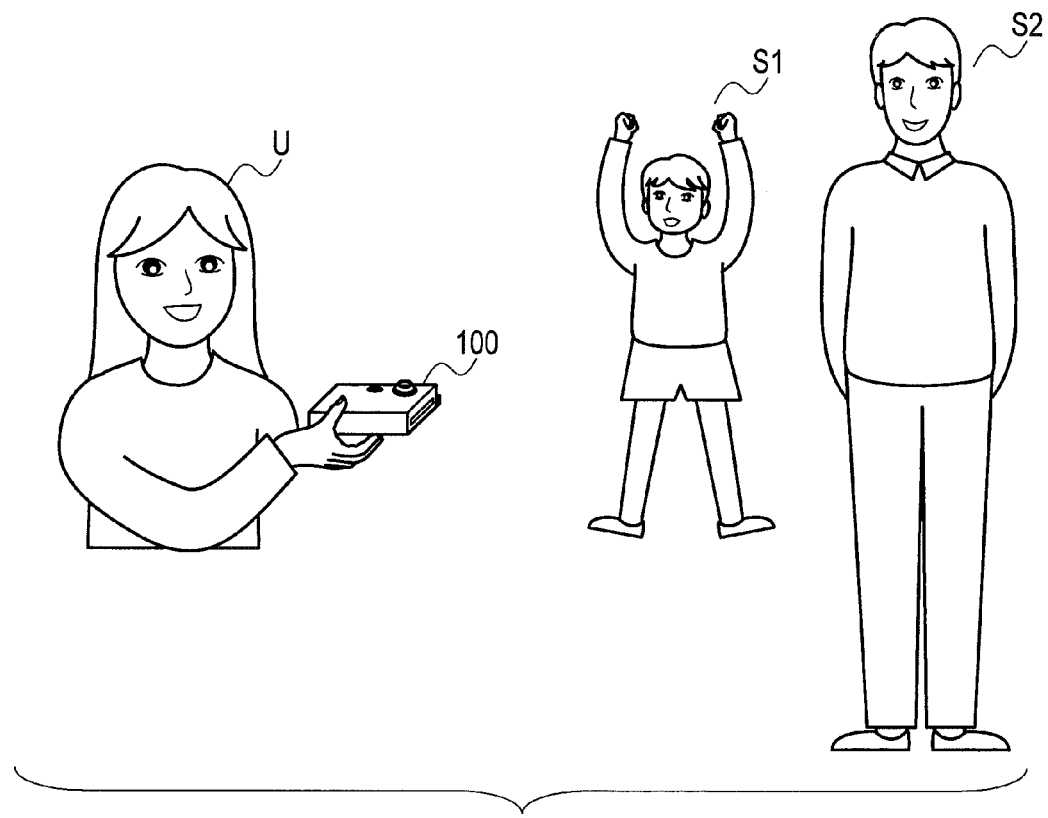
F I G. 10

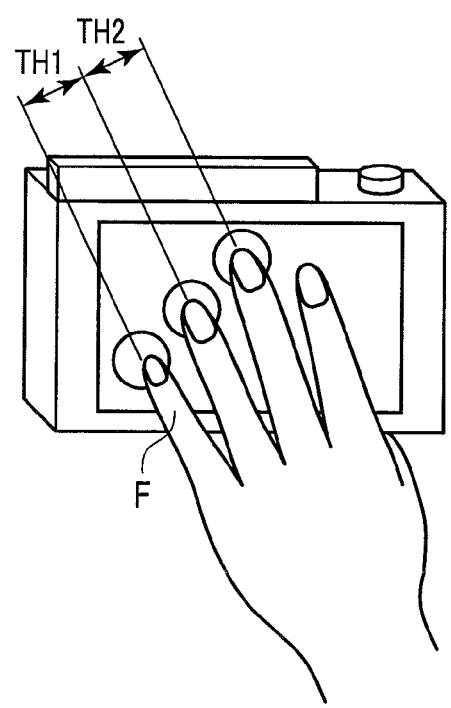
F I G. 17

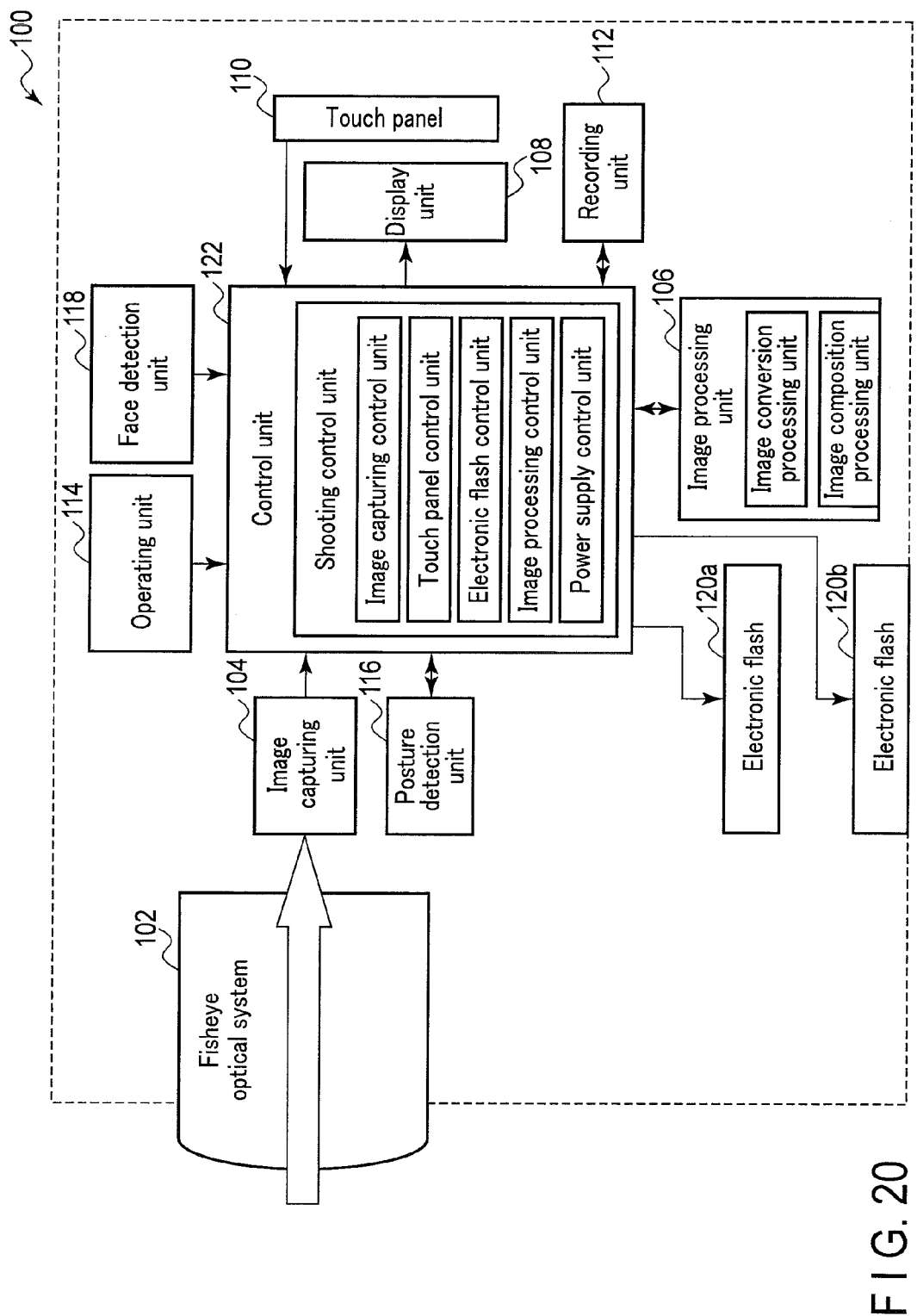
F I G. 20

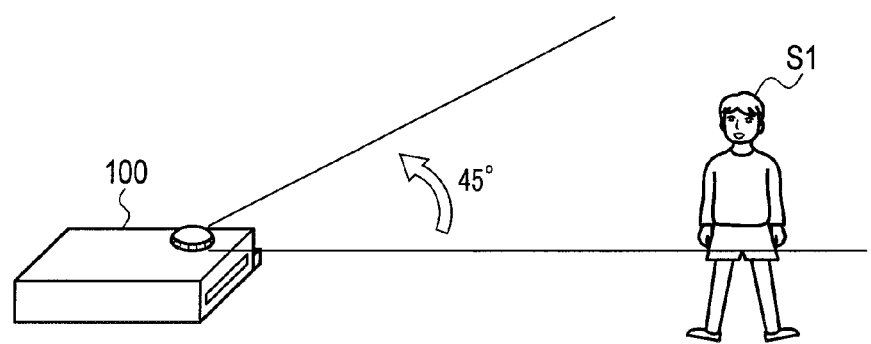
F I G. 24C

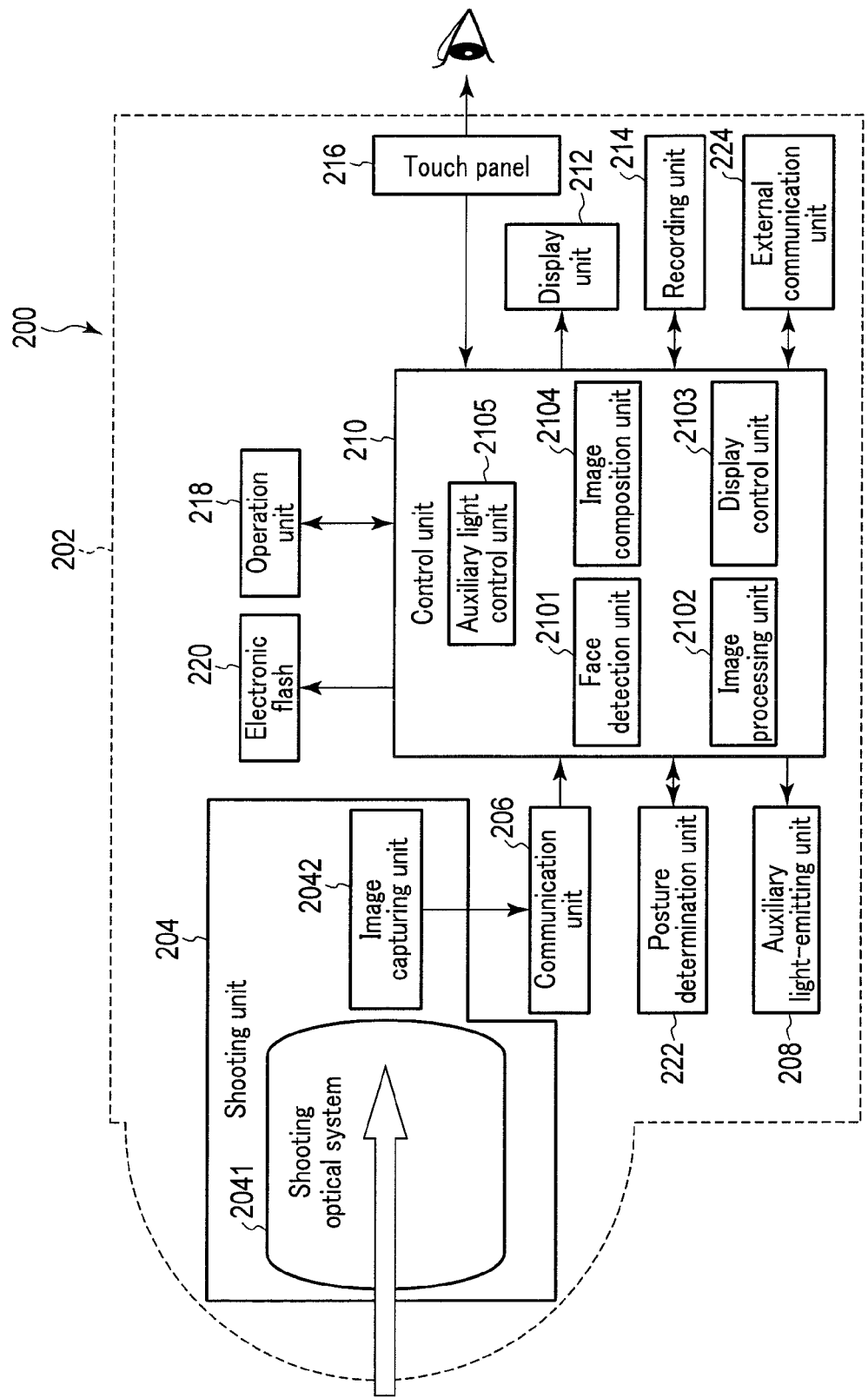
F I G. 25

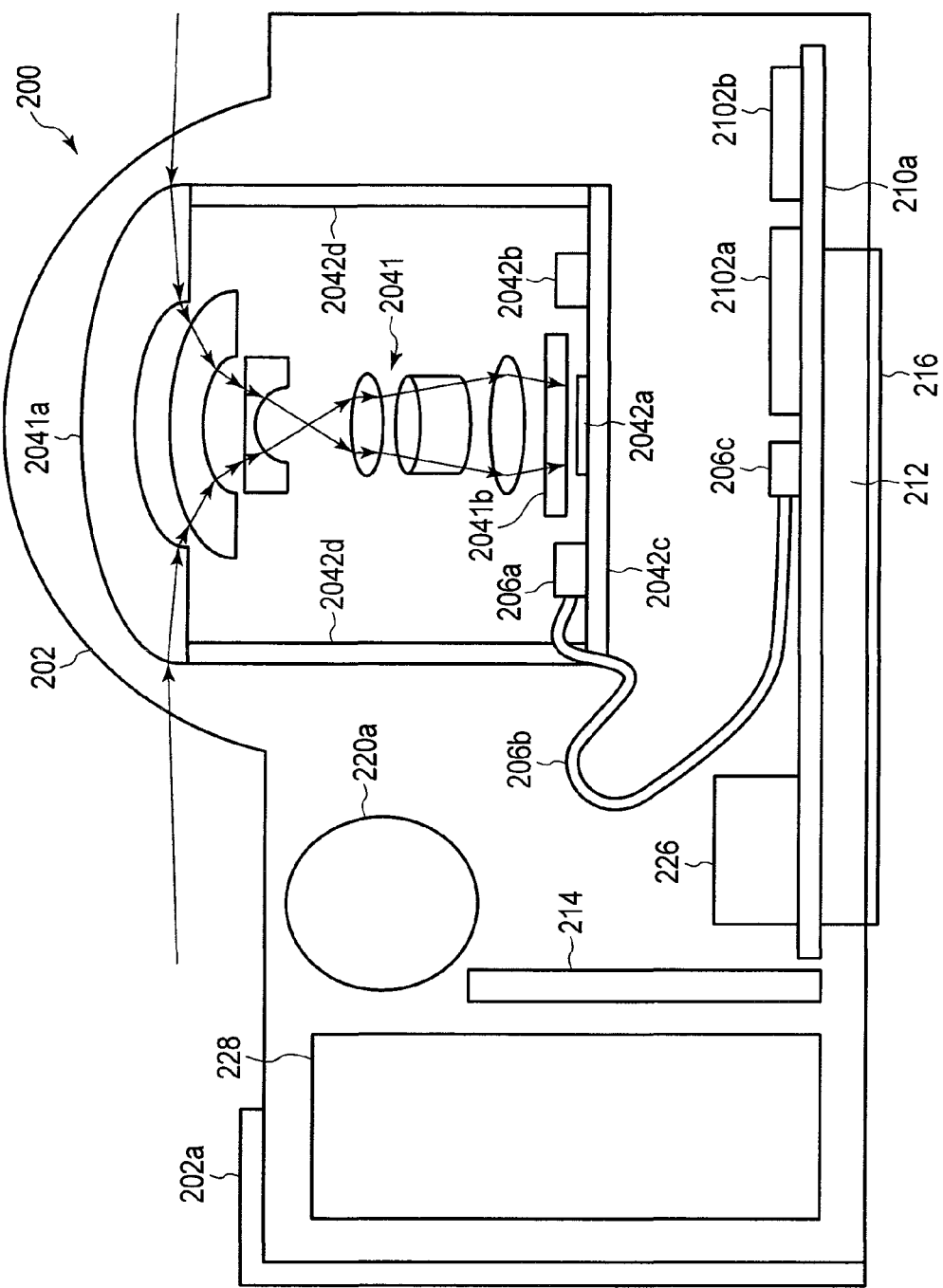
F I G. 26

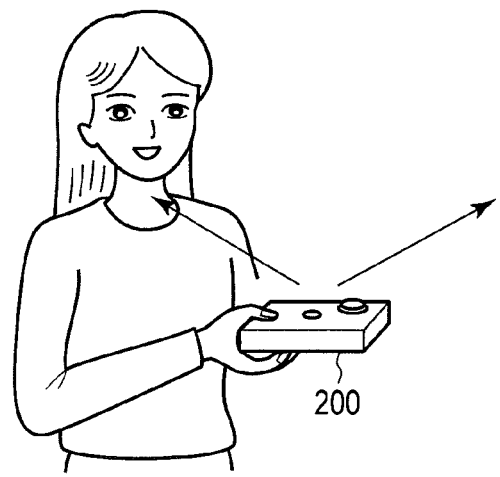
F I G. 27C
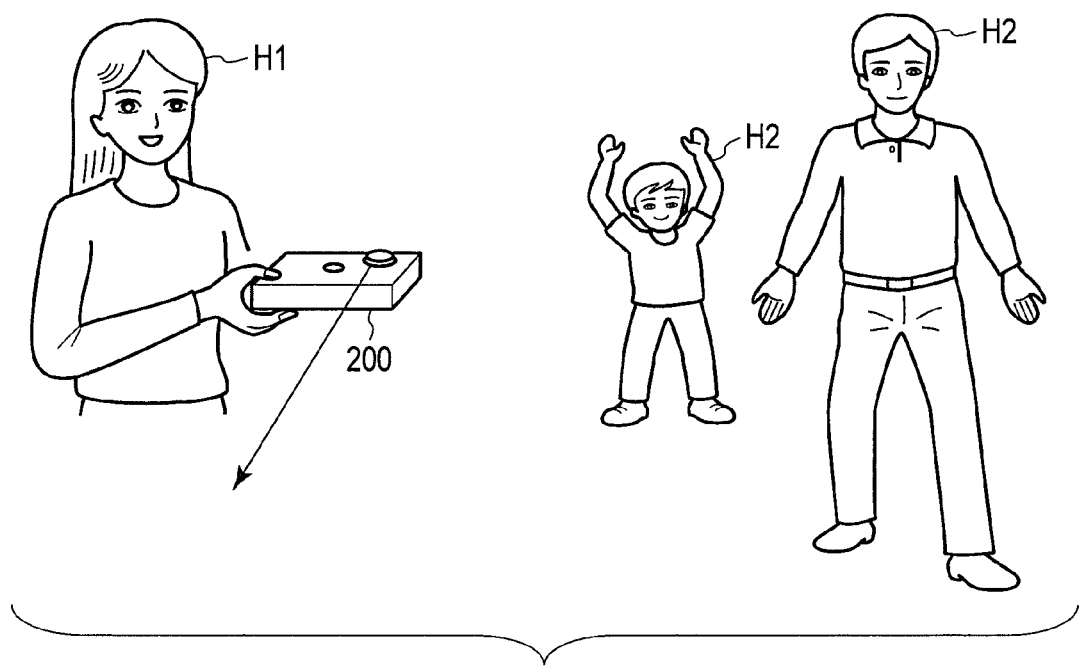
F I G. 28A

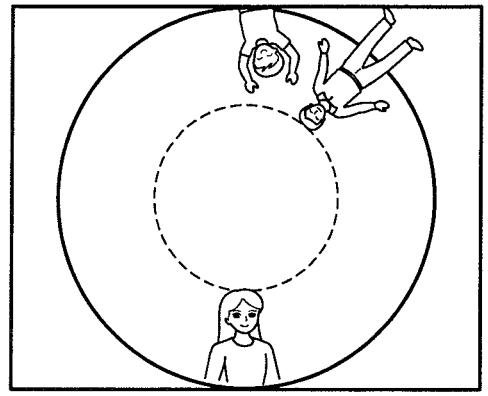
F I G. 28B
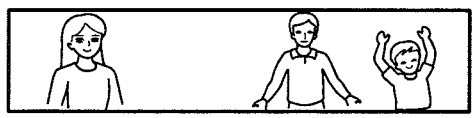
F I G. 28C

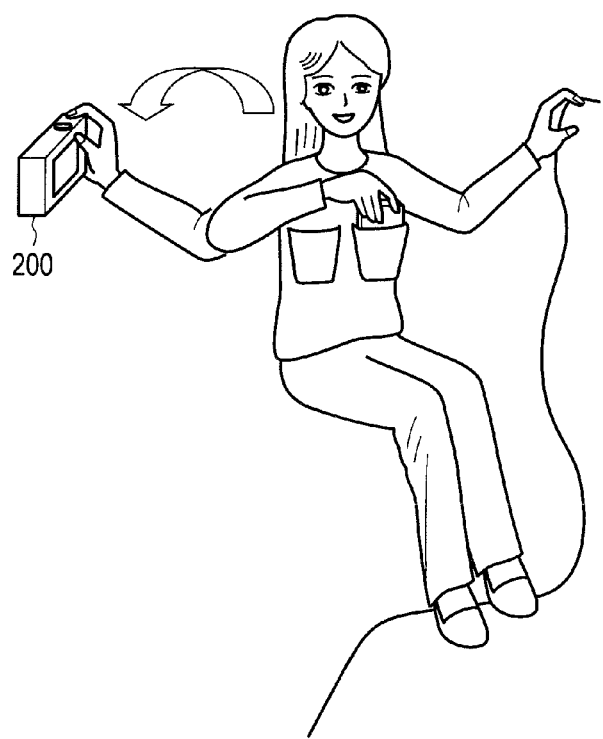
F I G. 30A

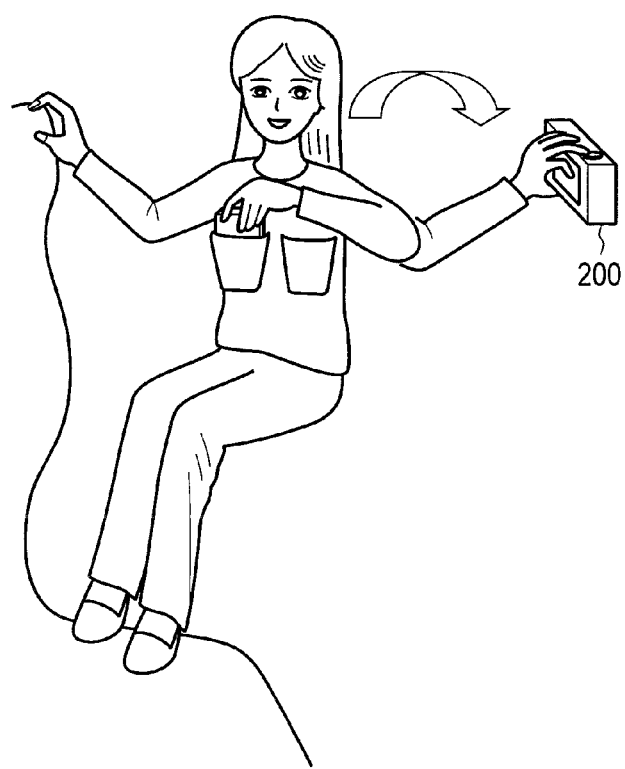
F I G. 30B

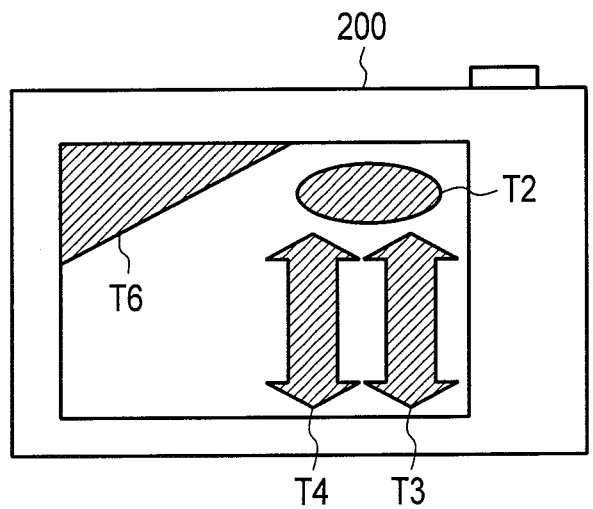
F I G. 35B
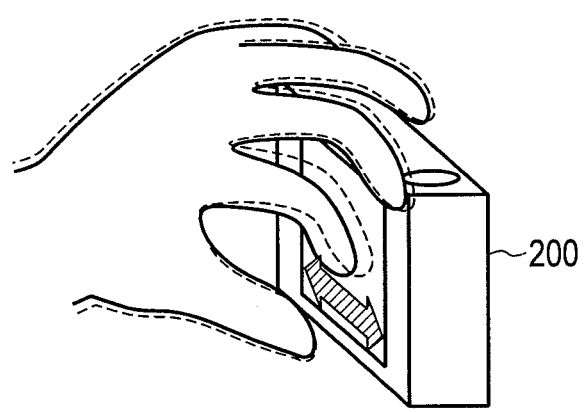
F I G. 35C

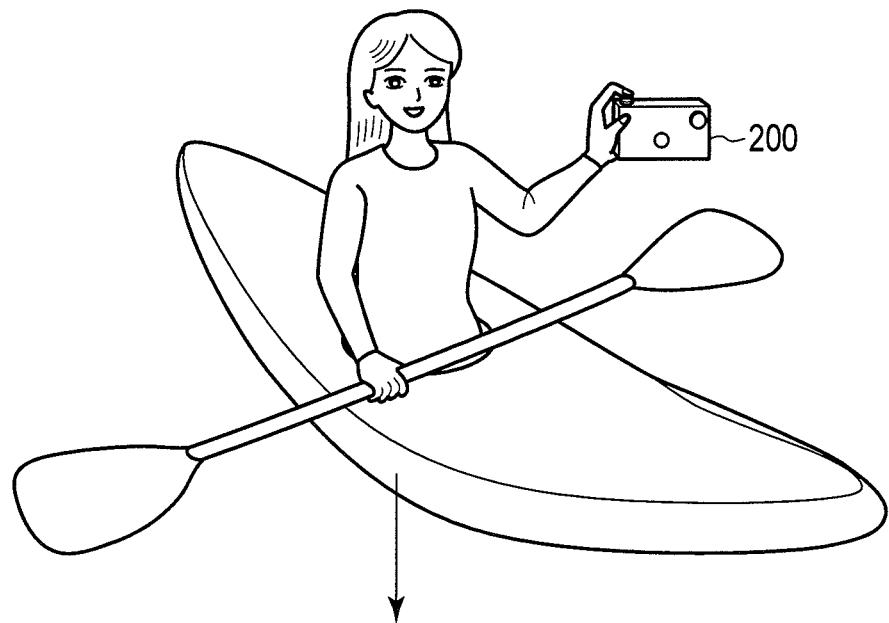
F I G. 36A
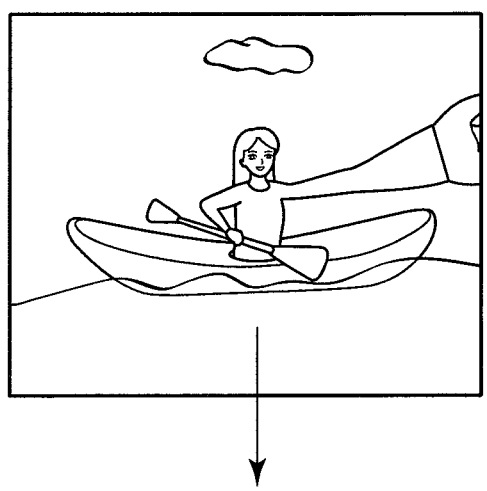
F I G. 36B

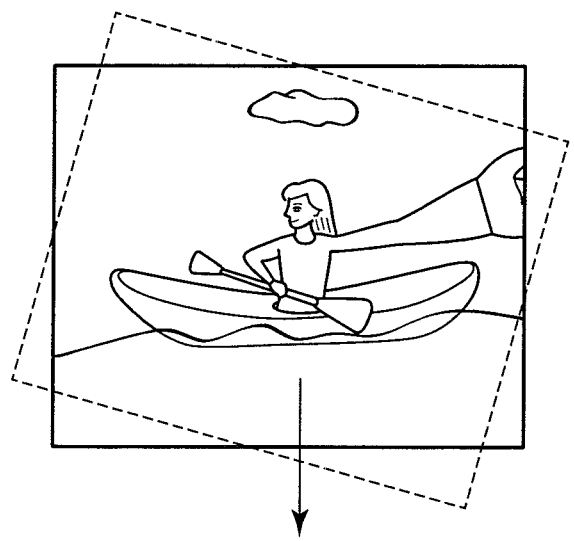
F I G. 36I
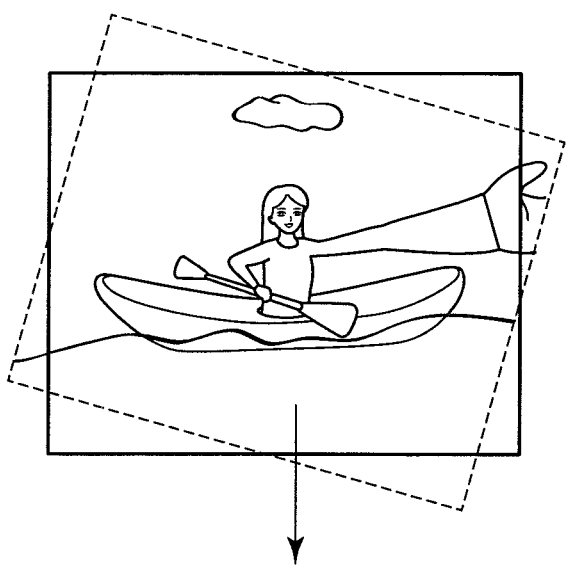
F I G. 36J

IMAGE CAPTURING APPARATUS AND IMAGE CAPTURING METHOD

CROSS REFERENCE TO RELATED APPLICATIONS

This application is a Continuation Application of PCT Application No. PCT/JP2014/063624, filed May 22, 2014, and based upon and claims the benefit of priority from the prior Japanese Patent Application No. 2013-111775, filed May 28, 2013, No. 2013-160584 filed Aug. 1, 2013, No. 2013-161533, filed Aug. 2, 2013, and No. 2013-161534, filed Aug. 2, 2013, the entire contents of all of which are incorporated herein by reference.

BACKGROUND OF THE INVENTION

1. Field of the Invention

The present invention relates to an image capturing apparatus and an image processing apparatus, which can perform special image processing, and an image processing method therefor.

2. Description of the Related Art

There is known an image capturing apparatus including a fisheye optical system as proposed in Jpn. Pat. Appln. KOKAI Publication No. 2012-022108. The fisheye optical system of Jpn. Pat. Appln. KOKAI Publication No. 2012-022108 is configured to have a large concave lens on the forefront surface. Such a fisheye optical system can form the image of a light beam from an angle of view of about 180° on the image sensor, although it produces a large distortion in the peripheral portion of an image.

By using a special wide-field optical system such as a fisheye optical system, a user can perform shooting that is impossible by a normal optical system. For example, assume that the user holds the image capturing apparatus such that the optical axis of the wide-field optical system faces the zenith. In this case, it is possible to shoot an image in all directions around the optical axis of the wide-field optical system, including the user himself/herself at once. When the user faces the wide-field optical system to himself/herself, special self-portrait photography can be performed in which not only the user's face but also his/her full-length body is shot. Since a wide range can be shot, blind manipulation shooting or no-look finder shooting, in which the user shoots without looking in the viewfinder, can also be performed in addition to the self-portrait photography.

BRIEF SUMMARY OF THE INVENTION

According to a first aspect of the invention, there is provided, an image capturing apparatus comprising: an optical system configured to form an image of a light beam from an object; an image capturing unit configured to obtain image data corresponding to the light beam by the optical system; a posture detection unit configured to detect a posture of the image capturing apparatus; and a control unit configured to determine based on the posture whether the image capturing apparatus is in a mode to perform shooting in a state in which an optical axis of the optical system faces a zenith or in a mode to perform shooting in a state in which the optical axis of the optical system faces a photographer side, and change control in a shooting operation using the image capturing unit in accordance with a result of the determination.

According to a second aspect of the invention, there is provided an image capturing method comprising: obtaining image data corresponding to a light beam by an optical system; detecting a posture of an image capturing apparatus; determining based on the posture whether the image capturing apparatus is in a mode to perform shooting in a state in which an optical axis of the optical system faces a zenith or in a mode to perform shooting in a state in which the optical axis of the optical system faces a photographer side; and changing control in a shooting operation in accordance with a result of the determination.

According to a third aspect of the invention, there is provided, a manipulation device comprising: a touch panel; and a control unit configured to, when the touch panel is gripped by a hand, control to provide a region of a manipulation touch portion used to perform a predetermined manipulation corresponding to the grip in a specific region corresponding to the grip in a region of the touch panel except a grip region that is a region of the touch panel where the grip of the hand is sensed.

According to a fourth aspect of the invention, there is provided, a method of controlling a manipulation device including a touch panel configured to be gripped by a hand and sense the grip of the hand, the method comprising: detecting that the touch panel is gripped by the hand; and providing a region of a manipulation touch portion used to perform a predetermined manipulation corresponding to the grip on the touch panel except a position where the grip of the hand is sensed, in accordance with information of a touch position in a grip region that is a touched region of the touch panel.

According to a fifth aspect of the invention, there is provided, an image processing apparatus comprising: a posture determination unit configured to, when a gravitational direction of image data matches the gravitational direction of the image data at the time of shooting, determine that the image data is horizontal image data, and when the gravitational directions do not match, determine that the image data is non-horizontal image data; a control unit configured to determine whether an object of the non-horizontal image data is similar to an object of the horizontal image data; and an image composition unit configured to, upon determining that the object of the non-horizontal image data is similar to the object of the horizontal image data, match the gravitational direction of the non-horizontal image data with the gravitational direction of at least one horizontal image data, generate composite image data by compositing the image data such that the object of the non-horizontal image data and the object of the at least one horizontal image data are aligned, and delete a portion of the horizontal image data overlapping the non-horizontal image data in the composite image data.

According to a sixth aspect of the invention, there is provided, an image capturing apparatus comprising: an image capturing unit configured to shoot an object and acquire image data including the object; a face detection unit configured to detect a face portion from the image data; an auxiliary light-emitting unit configured to emit guide light; and an auxiliary light control unit configured to control the auxiliary light-emitting unit so as to irradiate, with the guide light, a position where the face portion is not included in a shooting region of the image capturing unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIGS. 3A and 3B are views for explaining the disposition of an electronic flash;

FIG. 9 is a view showing an image after the images obtained by full-length self-portrait photography are composited;

FIG. 10 is a view showing an example of omnidirectional shooting as third shooting;

FIG. 17 is a view showing the state of a touch panel when the image processing apparatus is held as in FIG. 16;

FIG. 20 is a block diagram showing an arrangement as an example of an image capturing apparatus according to the second embodiment of the present invention;

FIGS. 24A, 24B, and 24C are views showing image conversion processing according to the second embodiment;

FIG. 25 is a block diagram showing the arrangement of an image capturing apparatus including a manipulation device according to the third embodiment of the present invention;

FIG. 26 is a front view for explaining details of the image capturing apparatus;

FIGS. 27A, 27B, and 27C are views showing use examples of the image capturing apparatus;

FIGS. 28A, 28B, and 28C are views for explaining omnidirectional shooting;

FIGS. 30A and 30B are views showing an example of a situation where the image capturing apparatus is gripped by a left hand;

FIGS. 35A, 35B, and 35C are views for explaining determination of a left-hand manipulation;

FIGS. 36A, 36B, 36C, 36D, 36E, 36F, 36G, 36H, 36I, 36J, 36K, and 36L are views showing examples of situations where image data composition is necessary.

DETAILED DESCRIPTION OF THE INVENTION

The embodiments of the present invention will now be described with reference to the accompanying drawings.

First Embodiment

Figure 1:
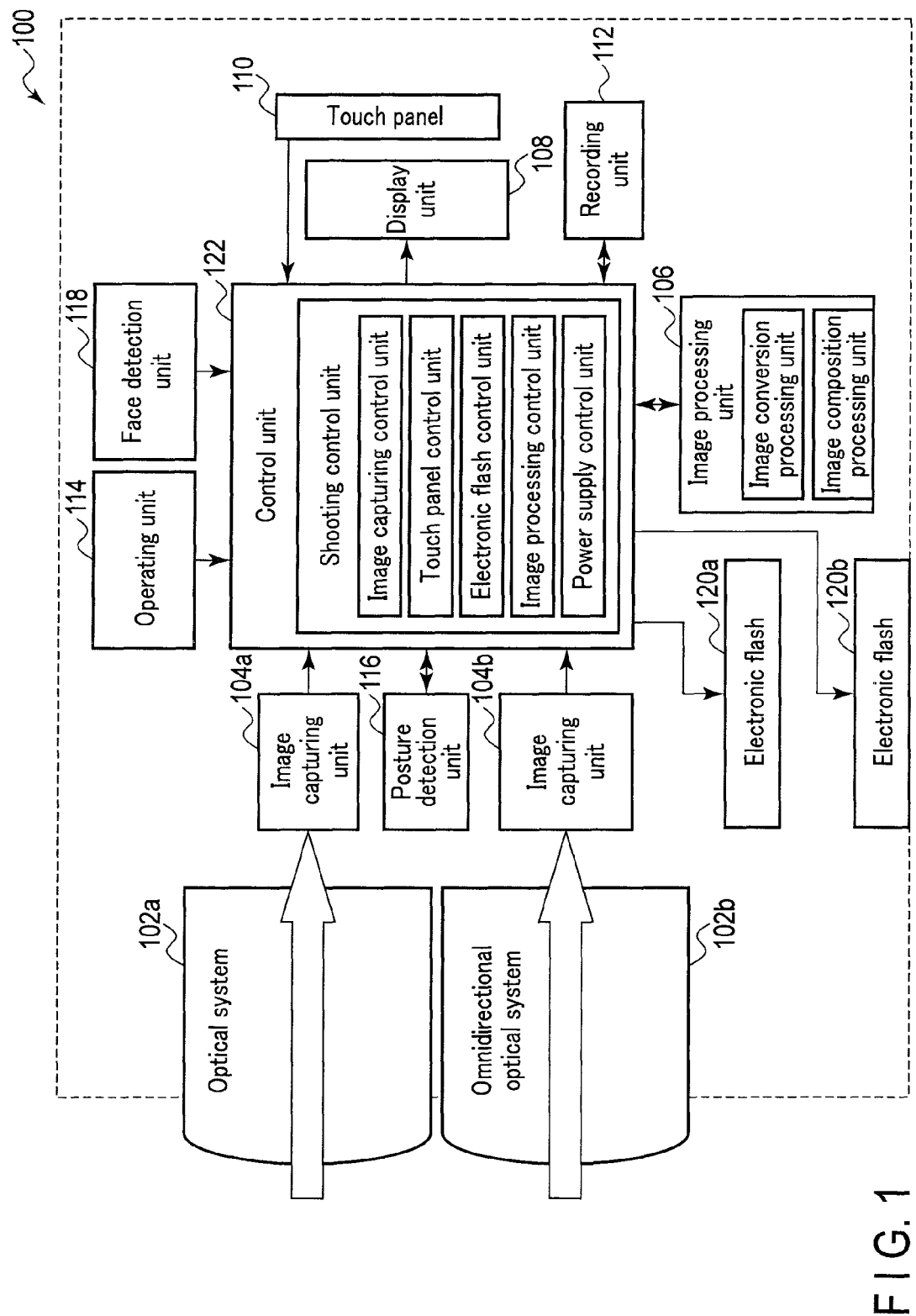
FIG. 1 is a block diagram showing an arrangement as an example of an image capturing apparatus according to the first embodiment of the present invention.

The first embodiment of the present invention will be described. FIG. 1 is a block diagram showing an arrangement as an example of an image capturing apparatus according to the first embodiment of the present invention. An image capturing apparatus 100 shown in FIG. 1 is, for example, a digital camera, a portable phone with a shooting function, or a portable terminal with a shooting function. The image capturing apparatus 100 shown in FIG. 1 includes an optical system 102a, an omnidirectional optical system 102b, an image capturing unit 104a, an image capturing unit 104b, an image processing unit 106, a display unit 108, a touch panel 110, a recording unit 112, a manipulation unit 114, a posture detection unit 116, a face detection unit 118, an electronic flash 120a, an electronic flash 120b, and a control unit 122.

Figure 2:
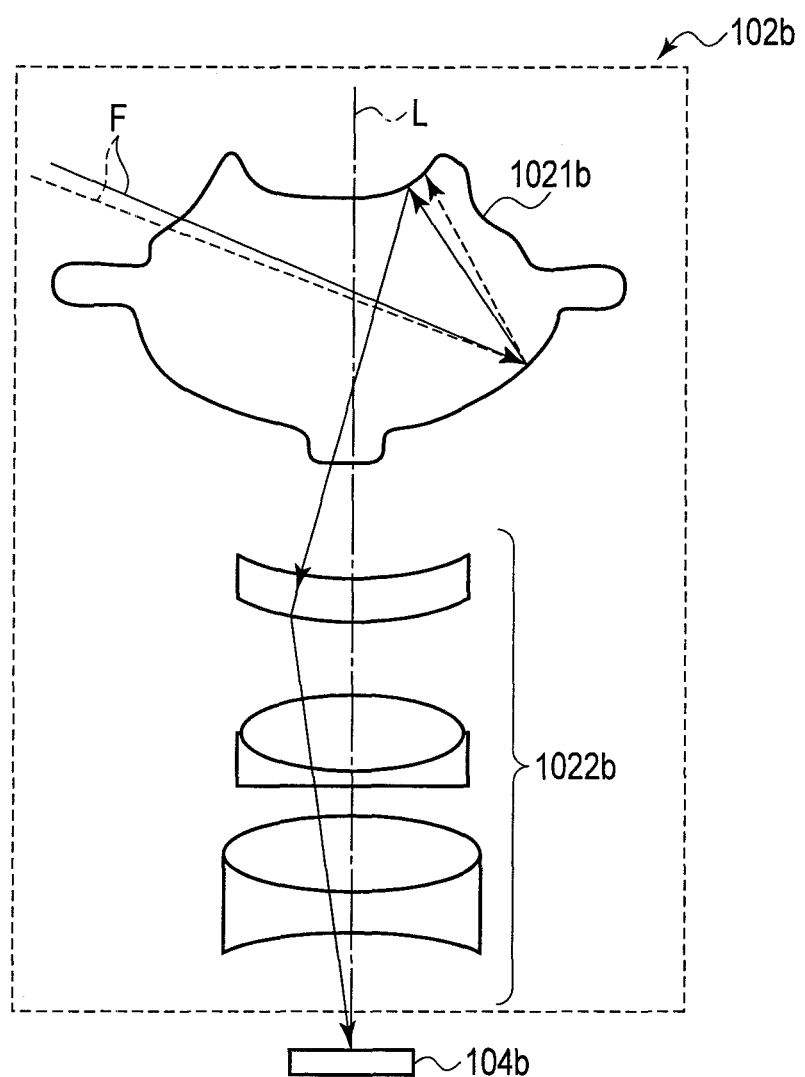
FIG. 2 is a view showing an example of the arrangement of an omnidirectional optical system.

The optical system 102a causes a light beam from an object to enter the image capturing unit 104a. The optical system 102a is, for example, a variable-focal-length optical system. The optical system 102a may be a fixed-focal-length optical system. The omnidirectional optical system 102b is disposed in the image capturing apparatus 100 such that its optical axis becomes parallel to that of the optical system 102a, and has a visual field (angle of view) wider than that of the optical system 102a. The omnidirectional optical system 102b is, for example, an optical system shown in FIG. 2. The omnidirectional optical system 102b of the example shown in FIG. 2 includes a free-form surface lens 1021b and an imaging lens group 1022b, and has a structure axially symmetrical with respect to an optical axis L. The free-form surface lens 1021b is configured to reflect, by the inner surfaces, a light beam F from all-sky directions with respect to the optical axis L as the zenith and make the light beam enter the imaging lens group 1022b. The imaging lens group 1022b is configured to make the light beam F, which has entered via the free-form surface lens 1021b, enter the image capturing unit 104b.

The image capturing unit 104a generates image data based on a light beam that has entered from the optical system 102a. The image capturing unit 104a includes an image sensor and an A/D conversion circuit. The image sensor converts the light beam whose image is formed via the optical system 102a into an analog electrical signal. The A/D conversion circuit converts the electrical signal obtained by the image sensor into image data that is a digital signal. The image capturing unit 104b generates image data based on a light beam that has entered from the omnidirectional optical system 102b. The image capturing unit 104b can have either the same arrangement as that of the image capturing unit 104a or a different arrangement. For example, the number of pixels of the image sensor and the area of the imaging plane may be larger in the image capturing unit 104b than in the image capturing unit 104a.

The image processing unit 106 performs image processing for the image data obtained by the image capturing unit 104a and the image data obtained by the image capturing unit 104b. The image processing unit 106 performs basic image processing such as white balance correction and gamma correction, which are necessary for display and recording of an image. The image processing unit 106 has the function of an image conversion processing unit configured to perform image conversion processing and the function of an image composition processing unit configured to perform image composition processing. Image conversion processing is processing of converting annular image data obtained via the image capturing unit 104b into strip-shaped image data. Image composition processing is processing of compositing image data obtained via the image capturing unit 104a and image data obtained via the image capturing unit 104b. Image conversion processing and image composition processing will be described later in detail.

The display unit 108 is, for example, a liquid crystal display provided on the back surface of the main body of the image capturing apparatus 100. The display unit 108 displays an image based on image data input from the control unit 122. The touch panel 110 is provided on, for example, the display screen of the display unit 108. The touch panel 110 detects contact of a user's finger or the like, and inputs the information of the contact position to the control unit 122. Note that the display unit 108 need not always be provided at one portion, and may be provided on a side surface of the main body of the image capturing apparatus 100 or on a side of the optical system. To improve portability, portable equipment tends to be more compact. In the compact portable equipment, there are many situations where the user cannot see and confirm the display unit 108 each time upon shooting. In consideration of the situations as well, the need for no-look shooting is becoming high.

The recording unit 112 is, for example, a memory card configured to be detachable from the image capturing apparatus 100. The recording unit 112 records various kinds of information such as image files generated by the control unit 122. In recent years, it is sometimes possible to wirelessly send data to an external recording unit and record it. In this case as well, the technique of this embodiment is effective.

The manipulation unit 114 includes mechanical manipulation members other than the touch panel 110 provided on the main body of the image capturing apparatus 100. The manipulation unit 114 includes, for example, a release button and a power switch. The release button is a manipulation member used by the user to instruct execution of shooting. The power switch is a manipulation member used by the user to instruct power-on or power-off of the image capturing apparatus 100.

The posture detection unit 116 is, for example, a three-axis acceleration sensor whose axes are disposed in parallel to the horizontal direction (X axis), vertical direction (Y axis), and depth direction (Z axis) of the image capturing apparatus 100, and detects the posture of the image capturing apparatus 100. FIGS. 3A and 3B show an example of the three axes set in the image capturing apparatus 100. The horizontal direction (X axis) is, for example, the direction of the image capturing apparatus 100 that is parallel to the earth's surface and perpendicular to the optical axes of the optical system 102a and the omnidirectional optical system 102b when the image capturing apparatus 100 is held in a horizontal position. The vertical direction (Y axis) is, for example, the direction of the image capturing apparatus 100 that is perpendicular to the earth's surface when the image capturing apparatus 100 is held in a horizontal position. The depth direction (Z axis) is, for example, the direction of the image capturing apparatus 100 that is parallel to the earth's surface and parallel to the optical axes of the optical system 102a and the omnidirectional optical system 102b when the image capturing apparatus 100 is held in a horizontal position.

The face detection unit 118 detects the face portion of a person in image data using, for example, pattern matching, and inputs the position information of the detected face portion to the control unit 122.

The electronic flashes 120a and 120b emit light, thereby illuminating an object. The electronic flashes 120a and 120b are provided on the main body of the image capturing apparatus 100 such that the light-emitting directions are perpendicular to each other. As shown in FIG. 3A, the electronic flash 120a serving as a first electronic flash is provided on, for example, the upper surface of the image capturing apparatus 100 such that the electronic flash 120a faces an object, that is, the light-emitting direction becomes parallel to the optical axes of the optical system 102a and the omnidirectional optical system 102b when the optical axes of the optical system 102a and the omnidirectional optical system 102b face the direction of the object. At this time, the electronic flash 120a is preferably provided on the upper surface of the image capturing apparatus 100 at a predetermined interval d with respect to the front surface of the image capturing apparatus 100 where the optical system 102a and the omnidirectional optical system 102b are provided, as shown in FIG. 3A. When the electronic flash 120a is provided in this way, a step difference is formed between the omnidirectional optical system 102b and the electronic flash 120a. This step difference prevents illumination light from the electronic flash 120a from directly entering the omnidirectional optical system 102b. As shown in FIG. 3B, the electronic flash 120b serving as a second electronic flash is provided on, for example, a side surface of the image capturing apparatus 100 such that the electronic flash 120b faces an object, that is, the light-emitting direction becomes perpendicular to the optical axes of the optical system 102a and the omnidirectional optical system 102b when the optical axes of the optical system 102a and the omnidirectional optical system 102b face the zenith.

The control unit 122 includes, for example, a CPU and controls the overall operation of the image capturing apparatus 100. The control unit 122 has the function of a shooting control unit. The function of the shooting control unit includes the function of an image capturing control unit, the function of a touch panel control unit, the function of an electronic flash control unit, the function of an image processing control unit, and the function of a power supply control unit. The function of the image capturing control unit is a function of controlling the exposure operation of the image capturing units 104*a* and 104*b*. The function of the touch panel control unit is a function of controlling settings of the touch panel 110 in accordance with the posture of the image capturing apparatus 100 at the time of shooting. The electronic flash control function is a function of causing one of the electronic flashes 120*a* and 120*b* to emit light in accordance with the posture of the image capturing apparatus 100 at the time of shooting when light emission of the electronic flash is necessary. The image processing setting function is a function of controlling the contents of image processing of the image processing unit 106 in accordance with the posture of the image capturing apparatus 100 at the time of shooting. The function of the power supply control unit is a function of performing control associated with power-on or power-off of each block of the image capturing apparatus 100. When the apparatus includes a plurality of display units, the control unit 122 may switch the display in accordance with the posture of the image capturing apparatus 100. At this time, the control unit 122 switches display in consideration of the display portion or portrait/landscape mode.

The operation of the image capturing apparatus 100 according to this embodiment will be described next. In this embodiment, the user changes the manner the image capturing apparatus 100 is held, thereby performing three different kinds of shooting.

Figure 4:
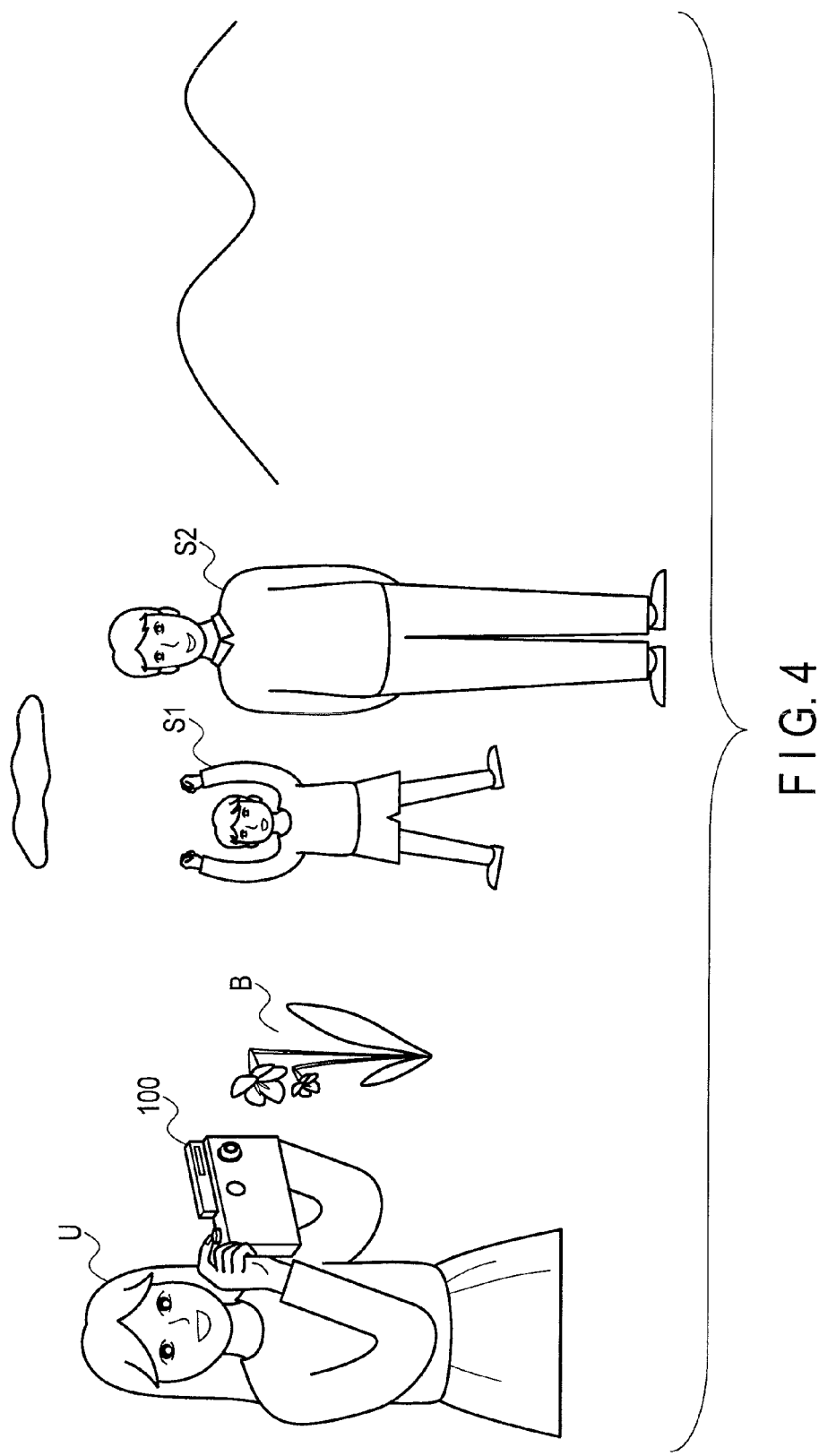
FIG. 4 is a view showing an example of normal shooting as first shooting.

FIG. 4 is a view showing an example of normal shooting as first shooting. As first shooting, a user U holds the image capturing apparatus 100 such that the optical axes of the optical system 102*a* and the omnidirectional optical system 102*b* face objects S1 and S2. When provided on the back surface without optical systems (the surface opposite to the optical system disposition surface), the display unit 108 can have a relatively large area. The user U performs shooting while confirming the timing and composition on the display unit 108.

Figure 5A:
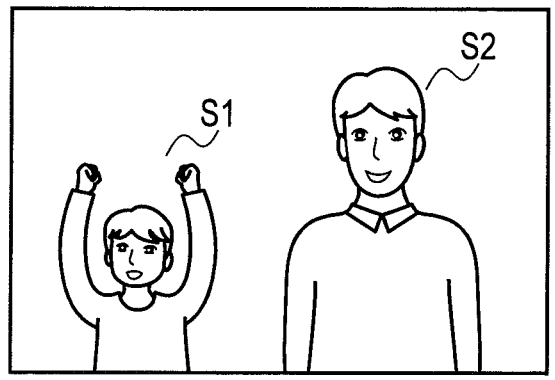
FIGS. 5A and 5B are views showing examples of images obtained by normal shooting.
Figure 5B:
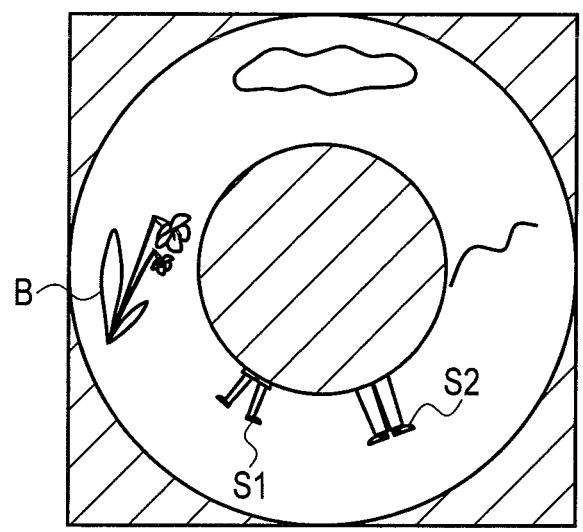

When the user U performs shooting in the state shown in FIG. 4, the image capturing unit 104*a* obtains an image in a predetermined rectangular range with respect to the optical axis of the optical system 102*a* as the center, as shown in FIG. 5A. For example, when the optical system 102*a* faces the objects S1 and S2, the image capturing unit 104*a* obtains an image around the objects S1 and S2. In addition, the image capturing unit 104*b* obtains an annular image in the range of 360° around the optical axis of the omnidirectional optical system 102*b*, as shown in FIG. 5B. For example, when the omnidirectional optical system 102*b* faces the objects S1 and S2, the image of a background B around the objects S1 and S2 is obtained. In such first shooting, the objects can be shot in the same way as in a conventional image capturing apparatus.

Figure 6:
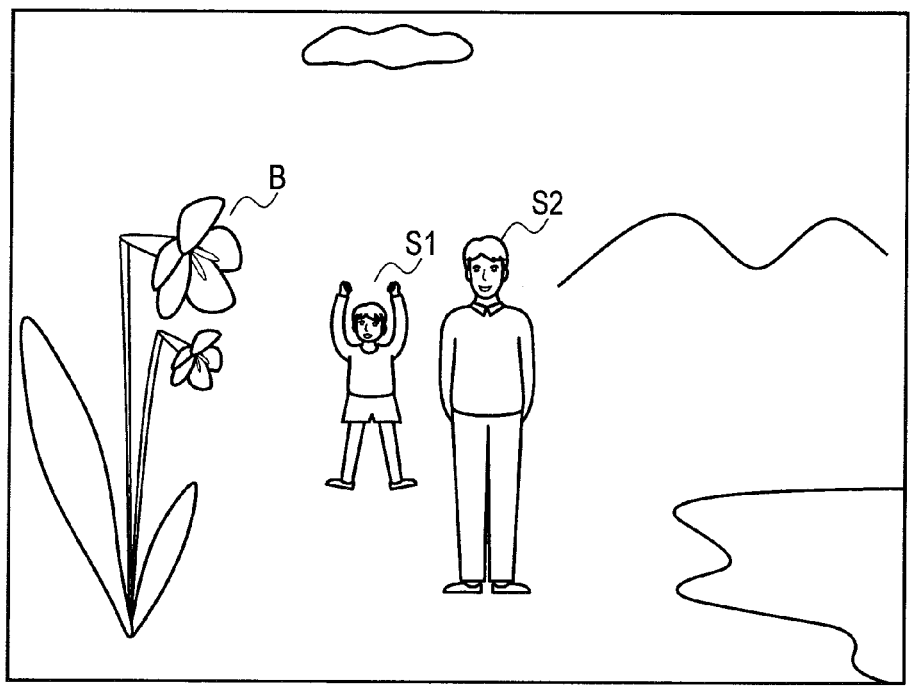
FIG. 6 is a view showing an image after the images obtained by normal shooting are composited.

The image data shown in FIG. 5A obtained by the image capturing unit 104*a* and the image data shown in FIG. 5B may be composited, as shown in FIG. 6. By composition, it is possible to obtain an image of an angle wider than in shooting using only the optical system 102*a*. For composition, a method is usable in which, for example, the image data shown in FIG. 5B is converted into strip-shaped image data by a method to be described later. After that, the image data shown in FIG. 5A is composited at the positions of the objects S1 and S2 in the strip-shaped image data. This composite image assumes display at the time of shooting or display at the time of reproduction. However, the specification may only record the converted image without displaying it.

Figure 7:
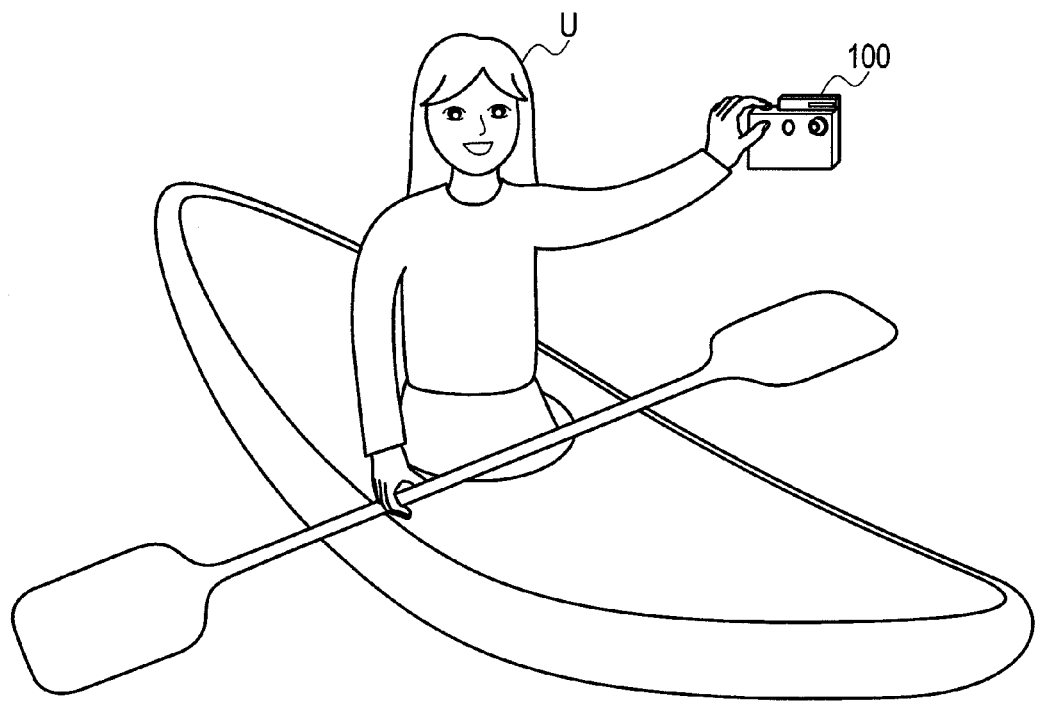
FIG. 7 is a view showing an example of full-length self-portrait photography as second shooting.
Figure 8A:
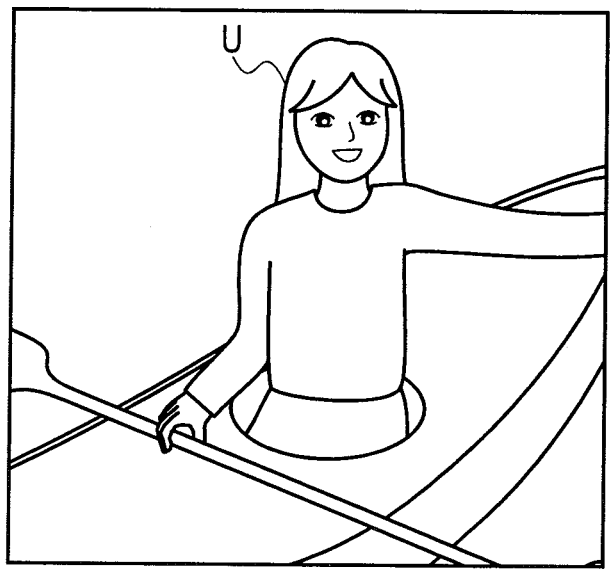
FIGS. 8A and 8B are views showing examples of images obtained by full-length self-portrait photography.
Figure 8B:
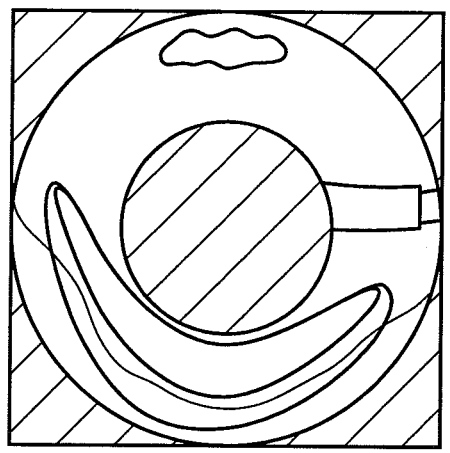

FIG. 7 is a view showing an example of full-length self-portrait photography as second shooting. As second shooting, the user U holds the image capturing apparatus 100 such that the optical axes of the optical system 102*a* and the omnidirectional optical system 102*b* face herself. When the user U performs shooting in the state shown in FIG. 7, the image capturing unit 104*a* obtains an image in a predetermined rectangular range with respect to the optical axis of the optical system 102*a* as the center, as shown in FIG. 8A. For example, when the optical system 102*a* faces the face portion of the user U, an image around the face portion of the user U is obtained. In addition, the image capturing unit 104*b* obtains an annular image in the range of 360° around the optical axis of the omnidirectional optical system 102*b*, as shown in FIG. 8B. For example, when the omnidirectional optical system 102*b* faces the face portion of the user U, an image around the body and the like of the user U is obtained. In such second shooting, not only an image near the face of the user U but also a peripheral image including the full-length body of the user can be obtained at the time of self-portrait photography. Even when provided on the surface with the optical system, the display unit 108 cannot have a large area. It is therefore difficult to do shooting while confirming the timing and composition. Especially, in an unstable situation, performing shooting while confirming may endanger safety because of a distraction.

The image data shown in FIG. 8A obtained by the image capturing unit 104*a* and the image data shown in FIG. 8B may be composited, as shown in FIG. 9. For composition, a method is usable in which, for example, the image data shown in FIG. 8B is converted into strip-shaped image data by a method to be described later. After that, the image data shown in FIG. 8A is composited at the position of the user U in the strip-shaped image data. This composite image assumes display at the time of shooting or display at the time of reproduction. However, the converted image may only be recorded without being displayed.

Figure 11:
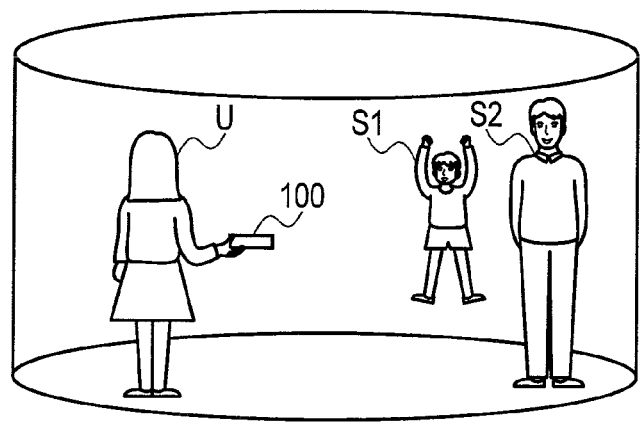
FIG. 11 is a view showing the relationship between objects at the time of shooting in FIG. 10.
Figure 12:
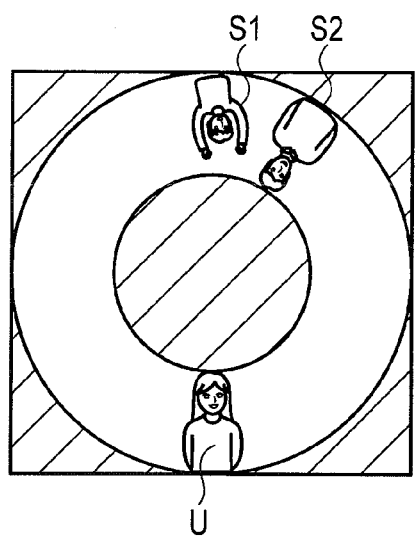
FIG. 12 is a view showing an example of an image obtained by omnidirectional shooting.

FIG. 10 is a view showing an example of omnidirectional shooting as third shooting. As third shooting, the user U holds the image capturing apparatus 100 such that the optical axes of the optical system 102*a* and the omnidirectional optical system 102*b* face the zenith. Assume that the user U and the objects S1 and S2 have, for example, a positional relationship shown in FIG. 11 in the three-dimensional space. At this time, when the user U performs shooting, the image capturing unit 104*b* obtains an image of 360° with respect to the optical axis of the omnidirectional optical system 102*b* as the center, as shown in FIG. 12. In such third shooting, an image around the image capturing apparatus 100, including the user U who is a photographer, can be shot at once. In this case as well, even when provided on the surface with the optical system or on a side surface of the image capturing apparatus 100, the display unit 108 cannot have a large area. It is therefore difficult to do shooting while confirming the timing and composition. Shooting excluding the photographer can also be performed by holding the image capturing apparatus overhead, as a matter of course.

Figure 13:
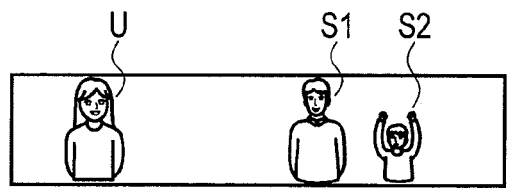
FIG. 13 is a view showing an image after image conversion processing is performed.

An image obtained based on an image that enters the image capturing unit 104*b* via the omnidirectional optical system 102*b* is an annular image as shown in FIG. 12. This annular image may be converted into a strip-shaped image as shown in FIG. 13. This image assumes display at the time of shooting or display at the time of reproduction. However, the converted image may only be recorded without being displayed.

Figure 14A:
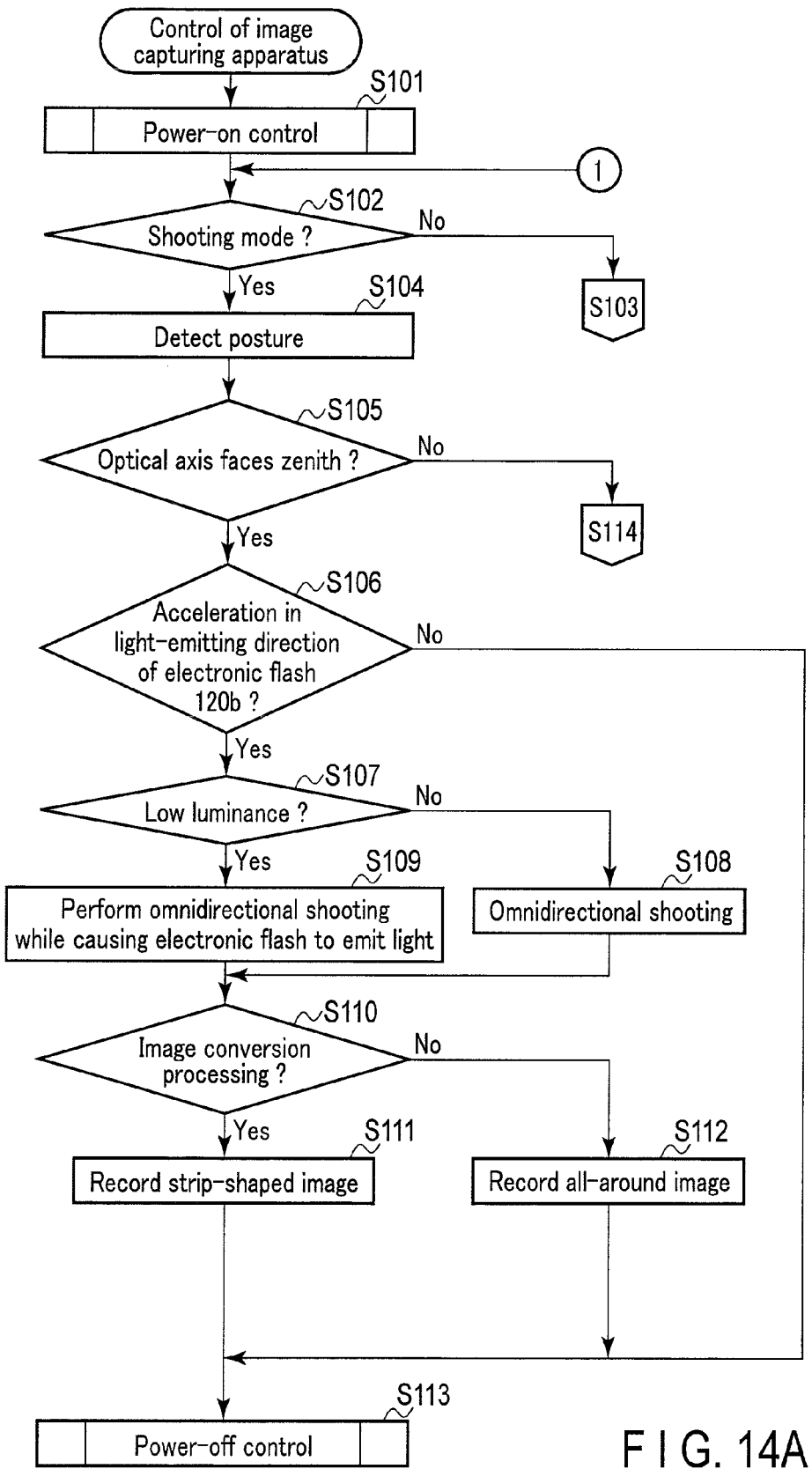
FIGS. 14A and 14B are flowcharts showing the operation of the image capturing apparatus.
Figure 14B:
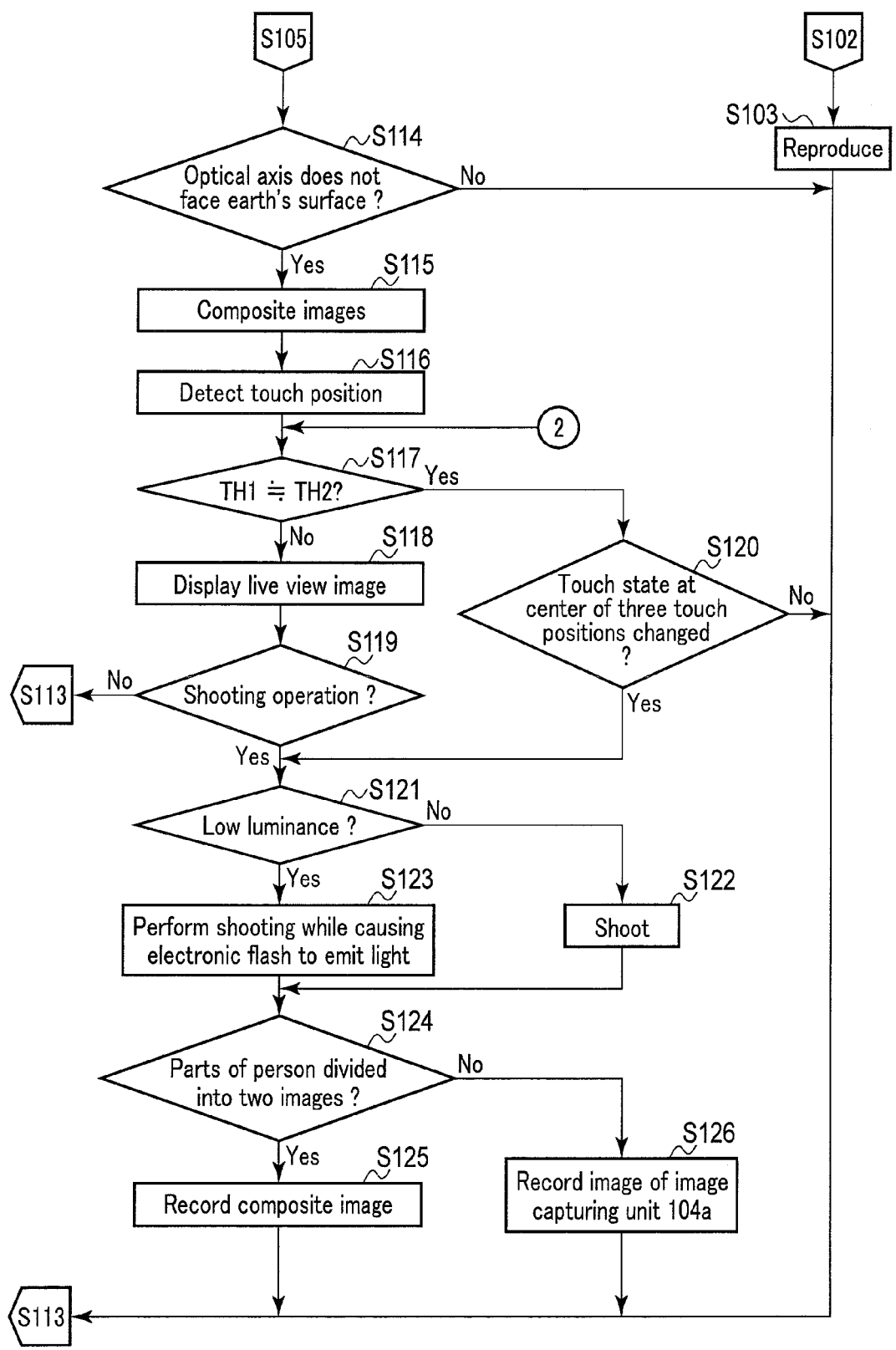

The operation of the image capturing apparatus 100 will further be described. FIGS. 14A and 14B are flowcharts showing the operation of the image capturing apparatus 100. Referring to FIGS. 14A and 14B, the control unit 122 performs power-on control (step S101). Power-on control is control to power on the image capturing apparatus 100 in accordance with various conditions. Details of power-on control will be described later. A description will continuously be made here assuming that the image capturing apparatus 100 is powered on as a result of power-on control.

After the image capturing apparatus 100 is powered on, the control unit 122 determines whether the operation mode of the image capturing apparatus 100 is a shooting mode (step S102). The image capturing apparatus 100 has a shooting mode and a reproduction mode as operation modes. The shooting mode is an operation mode to shoot an image to be recorded. The reproduction mode is an operation mode to reproduce a recorded image. Switching between the shooting mode and the reproduction mode is done by a user manipulation on the touch panel 110 or the manipulation of the manipulation unit 114.

Upon determining in step S102 that the operation mode is not the shooting mode, the control unit 122 performs processing of the reproduction mode (step S103). The same technique as in the related art can be applied to processing of the reproduction mode. Processing of the reproduction mode will briefly be explained. In the reproduction mode, a list of image files recorded in the recording unit 112 is displayed on the display unit 108. The user selects a desired one of the image files displayed in the list. The image file selected by the user is read out from the recording unit 112 and reproduced on the display unit 108. After processing of the reproduction mode, the process advances to step S113.

Upon determining in step S102 that the operation mode is the shooting mode, the control unit 122 causes the posture detection unit 116 to detect the posture of the image capturing apparatus 100 (step S104). After that, the control unit 122 determines, based on the detection result of the posture detection unit 116, whether the optical axes of the optical system 102a and the omnidirectional optical system 102b face the zenith, that is, whether omnidirectional shooting as shown in FIG. 10 is to be performed (step S105). When acceleration along the Y axis indicates gravitational acceleration, it can be detected that the optical axes face the zenith.

Upon determining in step S105 that the optical axes face the zenith, the control unit 122 determines whether acceleration in the light-emitting direction of the electronic flash 120b is generated, that is, whether the user has performed an operation of moving the image capturing apparatus 100 in the light-emitting direction of the electronic flash 120b (step S106). Generation of acceleration in the light-emitting direction of the electronic flash 120b can be detected from acceleration in the X direction. Upon determining in step S106 that no acceleration in the light-emitting direction of the electronic flash 120b is generated, the control unit 122 advances the process to step S113.

Upon determining in step S106 that acceleration in the light-emitting direction of the electronic flash 120b is generated, the control unit 122 determines whether the luminance of an object (for example, face) in image data obtained via the image capturing unit 104b is lower than a predetermined luminance (step S107). Upon determining in step S107 that the luminance of the object is not lower than the predetermined luminance, the control unit 122 executes omnidirectional shooting using the image capturing unit 104b (step S108). At this time, the control unit 122 controls exposure of the image capturing unit 104b such that the object attains an appropriate luminance, thereby executing shooting. Upon determining in step S107 that the luminance of the object is lower than the predetermined luminance, the control unit 122 executes omnidirectional shooting using the image capturing unit 104b while causing the electronic flash 120b to emit light because light-emission of the electronic flash is necessary (step S109). In the example of FIGS. 14A and 14B, the control unit determines whether the luminance is low, thereby determining the necessity of light emission of the electronic flash. Alternatively, for example, when the user does a setting to cause the electronic flash to emit light, the control unit may cause the electronic flash to emit light.

As described above, in this embodiment, when the optical axes face the zenith, shooting is executed using user's moving the image capturing apparatus 100 as a trigger. In omnidirectional shooting, as shown in FIG. 10, the user and the objects may exist so as to surround the image capturing apparatus 100. If the electronic flash 120a whose light-emitting direction is the same as the direction of the optical axes of the optical system 102a and the omnidirectional optical system 102b emits light in this state, the user and the objects may feel glare. Hence, when light emission of an electronic flash is necessary in omnidirectional shooting, not the electronic flash 120a but the electronic flash 120b is caused to emit light. The trigger for shooting execution by the image capturing apparatus 100 need not always be moving the image capturing apparatus 100. For example, a manipulation of the release button may be the trigger for shooting execution.

After omnidirectional shooting in step S108 or S109, the control unit 122 determines whether to perform image conversion processing, that is, whether to record strip-shaped image data as shown in FIG. 13 (step S110). Whether to record strip-shaped image data is selected by, for example, the user.

Figure 15:
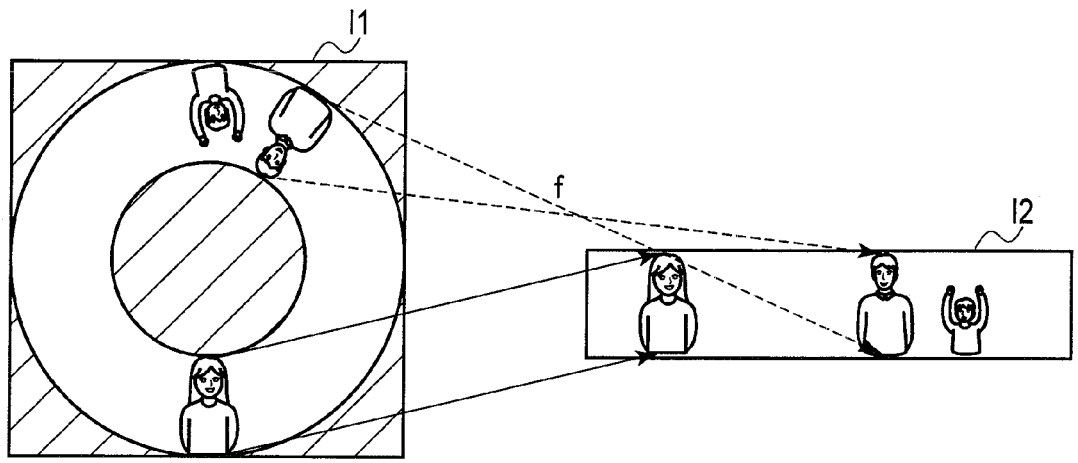
FIG. 15 is a view showing an example of an image conversion processing method.

Upon determining in step S110 not to perform image conversion processing, the control unit 122 creates an image file based on image data obtained by processing image data I1 in the while effective range of the image capturing unit 104b by the image processing unit 106, as shown in FIG. 15, and records the created image file in the recording unit 112 (step S111). The range to form an image on the image sensor by the omnidirectional optical system 102b is annular. On the other hand, the imaging plane of an image sensor is generally rectangular. Hence, image data recorded as an image file is rectangular image data even in omnidirectional shooting. Note that rectangular image data in which an annular image is formed will be referred to as all-around image data hereinafter.

Upon determining in step S110 to perform image conversion processing, the control unit 122 causes the image processing unit 106 to perform image conversion processing and generate strip-shaped image data I2. The control unit 122 creates an image file based on the created strip-shaped image data, and records the created image file in the recording unit 112 (step S112). As a method of creating strip-shaped image data, a method of creating strip-shaped image data by coordinate transformation using a transform function f representing the correspondence relationship between the coordinates of all-around image data and those of strip-shaped image data, as indicated by, for example, solid line arrows and broken line arrows in FIG. 15, is usable. However, the strip-shaped image data creation method is not limited to this, as a matter of course.

Next, the control unit 122 performs power-off control (step S113). Power-off control is control to power off the image capturing apparatus 100 in accordance with various conditions. Details of power-off control will be described later.

Upon determining in step S105 that the optical axes do not face the zenith, the control unit 122 determines whether the optical axes do not face the earth's surface (step S114). Whether the optical axes face the earth's surface can be detected from the acceleration along the Y axis. Upon determining in step S114 that the optical axes face the earth's surface, the control unit 122 advances the process to step S113. In this case, shooting is not performed. Upon determining in step S114 that the optical axes do not face the earth's surface, that is, when normal shooting as shown in FIG. 4 or full-length self-portrait photography as shown in FIG. 7 is to be performed, the control unit 122 causes the image processing unit 106 to composite the image data obtained by the image capturing unit 104a and the image data obtained by the image capturing unit 104b as shown in FIG. 6 or 9 (step S115).

Figure 16:
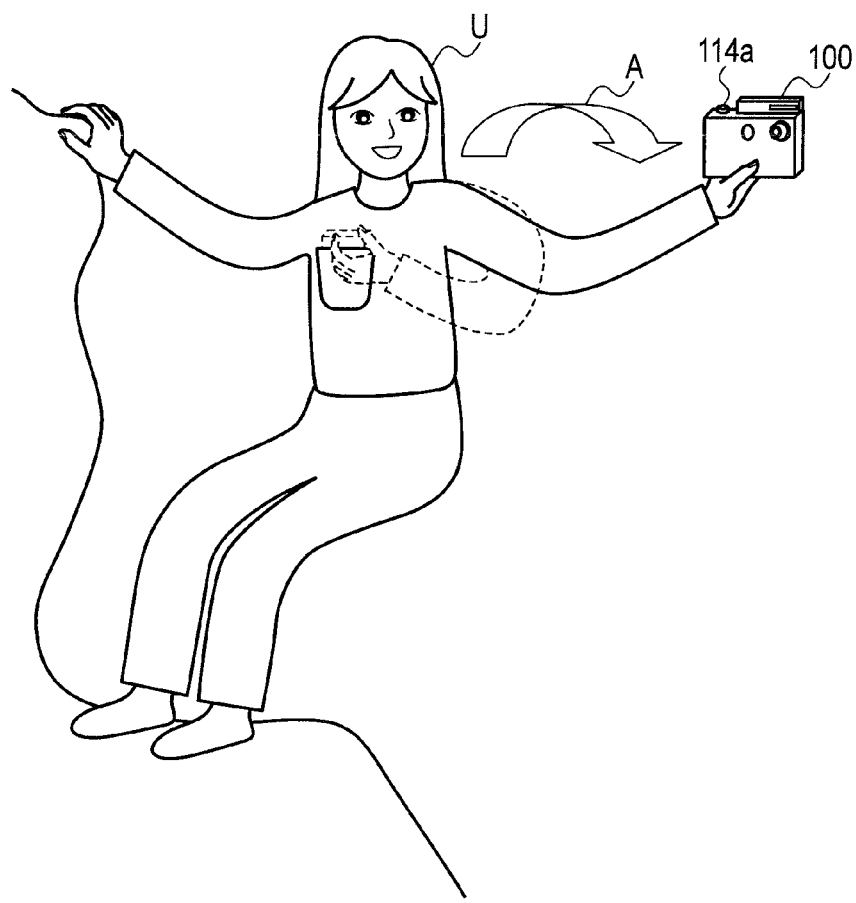
FIG. 16 is a view showing an example of shooting in an unstable situation.

Next, the control unit 122 detects a touch position on the touch panel 110 from its output (step S116). Shooting may be performed in an unstable situation. For example, FIG. 16 shows a situation where the user U is going to do self-portrait photography while holding on a cliff. At this time, the user holds on to the cliff by one hand and performs shooting while facing the image capturing apparatus 100 to herself by the other hand. When holding the image capturing apparatus 100 as shown in FIG. 16, it is difficult for the user U to press a release button 114a. If the user presses the release button 114a with difficulty, she may drop the image capturing apparatus 100. Hence, in a situation as shown in FIG. 16, shooting is preferably performed without using the release button 114a. In this embodiment, when the situation at the time of shooting is estimated as a situation as shown in FIG. 16, shooting can be performed by a shooting manipulation using the touch panel 110. The situation as shown in FIG. 16 is determined from, for example, the manner the user holds the image capturing apparatus 100. FIG. 17 is a view showing the state of the touch panel 110 when the image processing apparatus 100 is held as in FIG. 16. In a situation as shown in FIG. 16, the user U makes an attempt to take fast hold of the image capturing apparatus 100 by one hand so as not to drop it. At this time, fingers F of the user are expected to touch the touch panel 110, as shown in FIG. 17. That is, the user is expected to open the fingers F to some extent to support the image capturing apparatus 100. In this embodiment, a situation as shown in FIG. 16 is determined to have occurred when the intervals of the plurality of fingers F are almost equal, as shown in FIG. 17. That is, after touch detection, the control unit 122 determines whether intervals TH1 and TH2 between three touch positions in the vicinity are almost equal (step S117).

Upon determining in step S117 that the intervals TH1 and TH2 are not almost equal, the control unit 122 causes the display unit 108 to display the composite image generated in step S114 as a live view image (step S118). After that, the control unit 122 determines whether the user performs the shooting manipulation (step S119). Since the situation is not the situation as shown in FIG. 16, whether a shooting manipulation is not done can be determined by the same method as in the conventional technique. For example, whether the release button is pressed is determined. Upon determining in step S119 that no shooting manipulation is performed, the control unit 122 advances the process to step S113. Upon determining in step S119 that a shooting manipulation is performed, the control unit 122 advances the process to step S121. In this case, shooting is performed.

Upon determining in step S117 that the intervals TH1 and TH2 are almost equal, the control unit 122 determines whether the touch state of the central touch position out of the three touch positions in the vicinity changes (step S120). In the situation as shown in FIG. 16, the user cannot see the display unit 108. Hence, live view display is unnecessary. Upon determining in step S120 that the touch state of the central touch position does not change, the control unit 122 advances the process to step S113. Upon determining in step S120 that, for example, the user releases the finger and the touch state of the central touch position changes, the control unit 122 advances the process to step S121. In this case, shooting is performed. Especially in an image capturing apparatus capable of performing omnidirectional shooting, the optical system portion projects. For this reason, the user must perform shooting without touching the optical system portion. If a finger or the like projects to the side of the optical system, the finger is included in images. In an image capturing apparatus capable of performing omnidirectional shooting, the manner the user holds the apparatus is limited. When the user holds the equipment without placing a finger on the optical system, many fingers are placed on the back surface. Hence, in this shooting method, operation errors can be reduced by using many fingers. Additionally, since the manipulation can be performed by detecting not a specific position on the touch surface but only relative touch positions of fingers, shooting can quickly and reliably be performed. Conversely, in normal shooting, since such a shooting method is unnatural, operation errors can be prevented. Hence, this specification based on the posture of the equipment is effective for failure photo prevention, energy saving, privacy protection, and the like.

Upon determining to perform shooting, the control unit 122 determines whether the luminance of an object (for example, face) in the image data obtained via the image capturing unit 104b is lower than a predetermined luminance (step S121). Upon determining in step S121 that the luminance of the object is not lower than the predetermined luminance, the control unit 122 executes shooting using both the image capturing unit 104a and the image capturing unit 104b (step S122). At this time, the control unit 122 controls exposure of the image capturing unit 104a and the image capturing unit 104b such that the object attains an appropriate luminance, thereby executing shooting (normal shooting or full-length self-portrait photography). Upon determining in step S121 that the luminance of the object is lower than the predetermined luminance, the control unit 122 executes shooting using both the image capturing unit 104a and the image capturing unit 104b while causing the electronic flash 120a to emit light because light emission of the electronic flash is necessary (step S123). It is possible to appropriately illuminate the object by causing the electronic flash 120a to emit light. If light is excessively emitted, it is also detrimental to energy saving, and a flare and the like generated by reflected light affect the image quality, as a matter of course. Appropriate illumination can prevent people from being annoyed by glare.

After shooting, the control unit 122 determines whether parts of a person are divided to both the image data obtained by the image capturing unit 104a and the image data obtained by the image capturing unit 104b (step S124). For example, if only a face exists in the image data obtained by the image capturing unit 104a, and only a body exists in the image data obtained by the image capturing unit 104b, the control unit 122 determines that parts of a person are divided to both the image data obtained by the image capturing unit 104a and the image data obtained by the image capturing unit 104b. Human body detection is done using a known method such as flesh color detection or pattern matching. Upon determining in step S124 that parts of a person are divided to the two image data, the control unit 122 creates an image file based on image data obtained by causing the image processing unit 106 to composite, as shown in FIG. 6 or 9, the image data obtained by the image capturing units 104a and 104b upon shooting, and records the created image file in the recording unit 112 (step S125). Upon determining in step S124 that parts of a person are not divided to the two image data, the control unit 122 creates an image file based on the image data obtained by the image capturing unit 104a upon shooting, and records the created image file in the recording unit 112 (step S126). After recording the image file in step S125 or S126, the control unit 122 advances the process to step S113.

Figure 18:
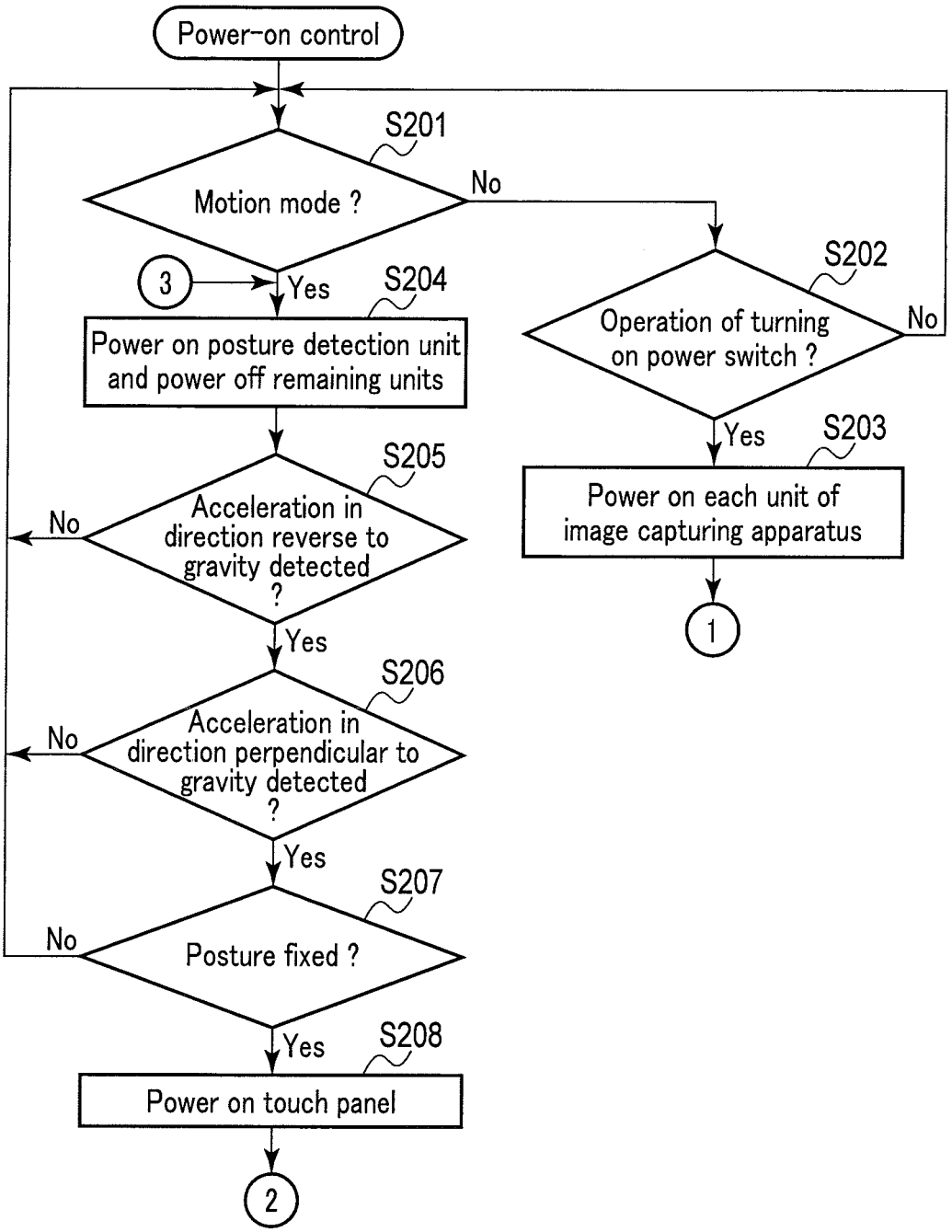
FIG. 18 is a flowchart showing power-on control.

FIG. 18 is a flowchart showing power-on control. In the power-on control, control is performed to automatically power on the image capturing apparatus 100 upon detecting a user operation of, for example, taking the image capturing apparatus 100 out of a pocket even without a manipulation of the power switch by the user. At the start of power-on control, the control unit 122 determines whether the power control mode is a motion mode (step S201). In the motion mode, control is performed to automatically power on or off the image capturing apparatus 100. The power control mode is switched to the motion mode by a user manipulation on the touch panel 110 or a manipulation of the manipulation unit 114.

Upon determining in step S201 that the power control mode is not the motion mode, the control unit 122 determines whether the user performs a manipulation of turning on the power switch (step S202). Upon determining in step S202 that the manipulation of turning on the power switch is not performed, the control unit 122 returns the process to step S201. In this case, the power-off state continues. Upon determining in step S202 that the manipulation of turning on the power switch is performed, the control unit 122 powers on each unit of the image capturing apparatus 100 shown in FIG. 1 (step S203). After that, the control unit 122 advances the process to step S102.

Upon determining in step S201 that the power control mode is the motion mode, the control unit 122 powers on the posture detection unit 116 and powers off the other units (step S204). The control unit 122 determines based on the output of the posture detection unit 116 whether acceleration in a direction reverse to the gravity is generated in the image capturing apparatus 100 (step S205). When the user U takes the image capturing apparatus 100 out of a pocket in the situation shown in FIG. 16, acceleration indicated by an arrow A is generated in the image capturing apparatus 100. The determination of step S205 is processing of determining whether acceleration in a direction reverse to the gravity, that is, upward acceleration is generated out of the acceleration indicated by the arrow A. Upon determining in step S205 that acceleration in a direction reverse to the gravity is not generated in the image capturing apparatus 100, the control unit 122 returns the process to step S201.

Upon determining in step S205 that acceleration in a direction reverse to the gravity is generated in the image capturing apparatus 100, the control unit 122 determines based on the output of the posture detection unit 116 whether acceleration in a direction perpendicular to the gravity is generated in the image capturing apparatus 100 (step S206). The determination of step S206 is processing of determining whether acceleration in a direction perpendicular to the gravity, that is, acceleration in a planar direction parallel to the earth's surface (a direction toward behind the user U in the example of FIG. 16) is generated out of the acceleration indicated by the arrow A. Upon determining in step S206 that acceleration in a direction perpendicular to the gravity is not generated in the image capturing apparatus 100, the control unit 122 returns the process to step S201.

Upon determining in step S206 that acceleration in a direction perpendicular to the gravity is generated in the image capturing apparatus 100, the control unit 122 determines based on the output of the posture detection unit 116 whether the posture of the image capturing apparatus 100 is fixed (step S207). Fixation of the posture is determined when, for example, the acceleration detected by the posture detection unit 116 does not change for a predetermined time (for example, about 5 sec). Upon determining in step S207 that the posture is not fixed, the control unit 122 returns the process to step S201.

Upon determining in step S207 that the posture is fixed, the control unit 122 powers on the touch panel 110 (step S208). After that, the control unit 122 advances the process to step S117. By the determination of steps S205 to S207, the user is estimated to be performing an operation of taking the image capturing apparatus 100 out of a pocket. In this embodiment, assuming a possibility of shooting as shown in FIG. 16, if the determination ends with a "YES" in at least one of steps S205 to S207, the control unit powers on the touch panel 110 and immediately performs determination of step S117. This allows the user to do shooting without manipulating a manipulation unit such as a power switch or a release button in the situation as shown in FIG. 16.

Figure 19:
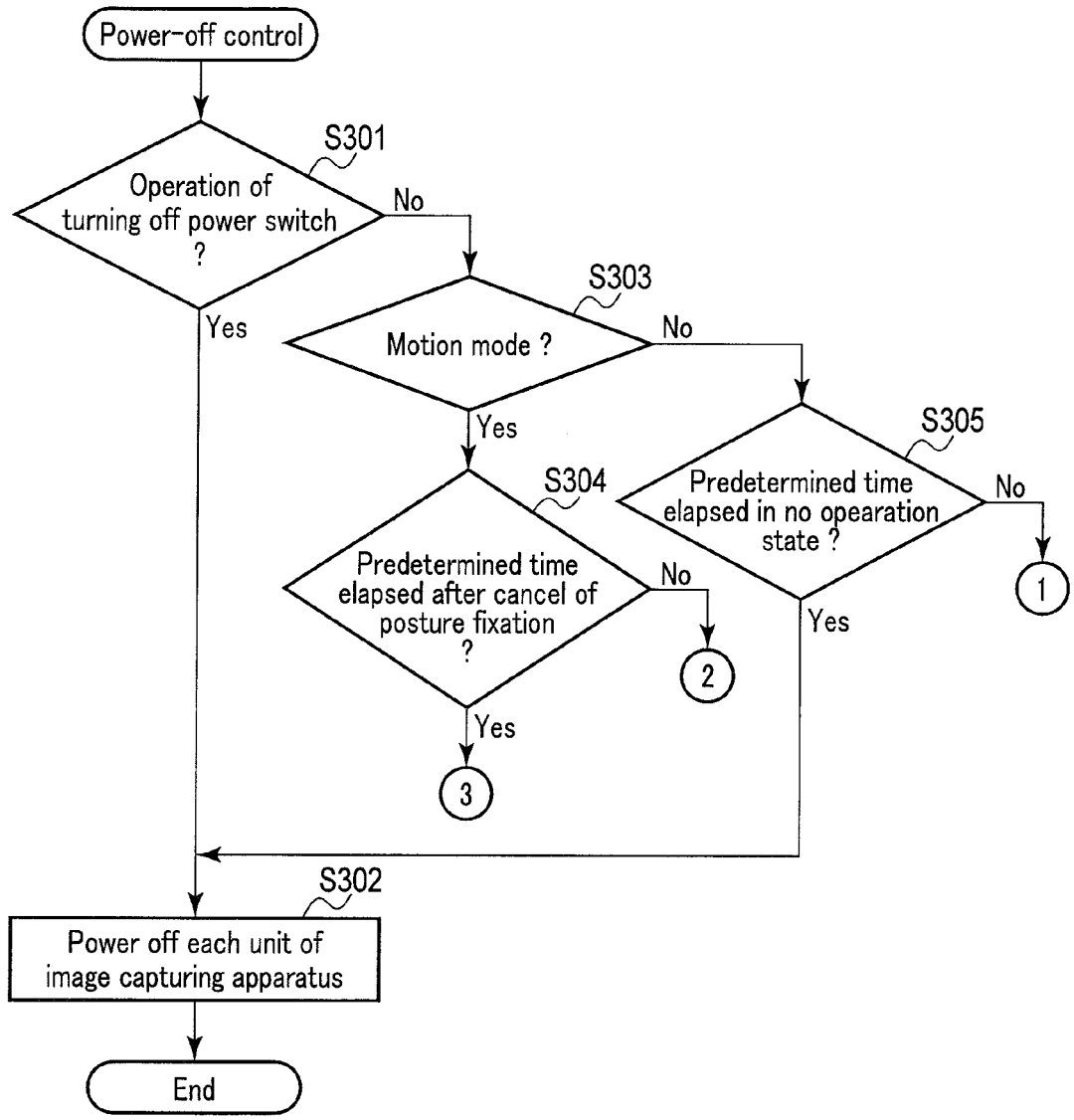
FIG. 19 is a flowchart showing power-off control.

FIG. 19 is a flowchart showing power-off control. In the power-off control, control is performed to automatically power off the image capturing apparatus 100 after the elapse of a predetermined time even without a manipulation of the power switch by the user. At the start of power-off control, the control unit 122 determines whether the user performs a manipulation of turning off the power switch (step S301). Upon determining in step S301 that the manipulation of turning off the power switch is performed, the control unit 122 powers off the units of the image capturing apparatus 100 shown in FIG. 1 (step S302). After powering off the units of the image capturing apparatus 100, the control unit 122 ends the power-off control. At this time, necessary units of the control unit 122 keep the power-on state so as to perform power-on control even after power-off.

Upon determining in step S301 that the manipulation of turning off the power switch is not performed, the control unit 122 determines whether the power control mode is the motion mode (step S303). Upon determining in step S303 that the power control mode is the motion mode, the control unit 122 determines based on the output of the posture detection unit 116 whether a predetermined time (for example, 5 sec) has elapsed after cancel of fixation of the posture of the image capturing apparatus 100 (step S304). Upon determining in step S304 that the predetermined time has not elapsed after cancel of fixation of the posture of the image capturing apparatus 100, the control unit 122 advances the process to step S117. In this case, the image capturing apparatus 100 is maintained in the power-on state assuming that the user still intends to shoot. Upon determining in step S304 that the predetermined time has elapsed after cancel of fixation of the posture of the image capturing apparatus 100, the control unit 122 advances the process to step S204. In this case, power-on control in the motion mode is performed.

Upon determining in step S303 that the power control mode is not the motion mode, the control unit 122 determines whether a predetermined time (for example, 1 minute) has elapsed in a no manipulation state (step S305). Upon determining in step S305 that the predetermined time has not elapsed in the no manipulation state, the control unit 122 returns the process to step S102. In this case, the image capturing apparatus 100 keeps the power-on state. Upon determining in step S305 that the predetermined time has elapsed in the no manipulation state, the control unit 122 advances the process to step S302. In this case, the units of the image capturing apparatus 100 are powered off.

As described above, in this embodiment, two kinds of optical systems, that is, the normal optical system 102a and the omnidirectional optical system 102b are provided in the image capturing apparatus 100. For this reason, in this embodiment, two different kinds of self-portrait photography can be performed in accordance with the posture of the image capturing apparatus 100 in addition to normal shooting. That is, in full-length self-portrait photography, not only the user's face portion but also his/her full-length body can be shot. In omnidirectional shooting, an image of 360° around the image capturing apparatus 100 can be obtained. It is therefore possible to simultaneously shoot a plurality of objects surrounding the image capturing apparatus 100. Additionally, in this embodiment, annular image data obtained by omnidirectional shooting can be converted into strip-shaped image data and recorded. The same effects as described above can be obtained even by replacing "self-portrait photography" with "back shooting" or "no-look shooting", which is shooting toward the user himself/herself, and this applies not only to this embodiment, as a matter of course.

At the time of full-length self-portrait photography or the like, a situation where the user cannot manipulate the manipulation unit 114 may occur. In this embodiment, the situation shown in FIG. 16 where the user cannot manipulate the manipulation unit 114 is determined from a change in the posture of the image capturing apparatus 100. When it is estimated that the situation shown in FIG. 16 has occurred, a shooting manipulation by the touch panel 110 is enabled. In the situation as shown in FIG. 16, it is also difficult to manipulate the power switch. In this embodiment, when it is estimated that the situation shown in FIG. 16 has occurred, the image capturing apparatus 100 is automatically powered on or off. This allows the user to perform the shooting manipulation even in the situation as shown in FIG. 16 where the manipulation unit 114 is difficult to manipulate. Note that at the time of self-portrait photography as shown in FIG. 16, the hand of the user U who is holding the image capturing apparatus 100 is assumed to be included in image data obtained by the image capturing unit 104a or the image capturing unit 104b. Hence, instead of performing the determination of step S117, a hand in image data may be detected to determine the situation as shown in FIG. 16. Alternatively, the face of the user U may simply be detected to determine the situation as shown in FIG. 16.

In this embodiment, image data obtained via the optical system 102a and image data obtained via the omnidirectional optical system 102b at the time of normal shooting or full-length self-portrait photography can be composited. This makes it possible to obtain a wide-field image that cannot be obtained only by the optical system 102a.

In this embodiment, two electronic flashes having different light-emitting directions are provided in the image capturing apparatus 100. This makes it possible to select an appropriate electronic flash according to the posture of the image capturing apparatus 100 and illuminate an object.

Second Embodiment

Figure 21:
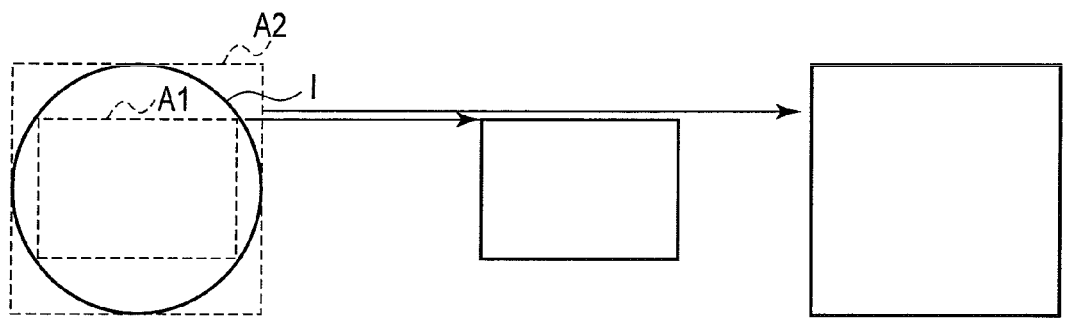
FIG. 21 is a view showing switching of an image trimming range.

The second embodiment of the present invention will be described next. FIG. 20 is a block diagram showing an arrangement as an example of an image capturing apparatus according to the second embodiment of the present invention. The same reference numerals as in FIG. 1 denote the same parts in FIG. 20, and a description thereof will be omitted. An image capturing apparatus 100 according to the second embodiment includes a fisheye optical system 102c in place of the optical system 102a and the omnidirectional optical system 102b. The fisheye optical system 102c has a large concave lens on the front surface, and is configured to make light beams from all-sky directions with respect to the axis as the zenith enter an image capturing unit 104 via the concave lens. Unlike the omnidirectional optical system 102b, the fisheye optical system 102c forms a circular image as indicated by the left portion of FIG. 21 on the image sensor of the image capturing unit 104. In other words, in the second embodiment, a light beam forms an image even at the center of the image sensor. Hence, in the second embodiment, two optical systems are not necessary. For this reason, only one image capturing unit suffices.

The operation of the image capturing apparatus 100 according to this embodiment will be described next. The basic operation of the image capturing apparatus 100 according to the second embodiment is the same as that described in the first embodiment. That is, in the second embodiment as well, the user changes the manner the image capturing apparatus 100 is held, thereby performing three kinds of shooting: normal shooting, full-length self-portrait photography (or back shooting), and omnidirectional shooting. Unlike the first embodiment, since the fisheye optical system 102c is used, a wide-field image can be obtained without image composition processing as in the first embodiment. However, large distortions remain at the edges of an image. Hence, in, for example, normal shooting, image data (diagonal image data) of a rectangular region A1 having relatively small distortions and inscribed in an image circle I (a range where the fisheye optical system 102c forms an image of a luminance that can be regarded as effective) is preferably trimmed and recorded. On the other hand, in full-length self-portrait photography or omnidirectional shooting, image data (all-around image data) of an entire region A2 is preferably recorded without trimming. The user may select whether to record diagonal image data or all-around image data, as a matter of course.

Figure 22:
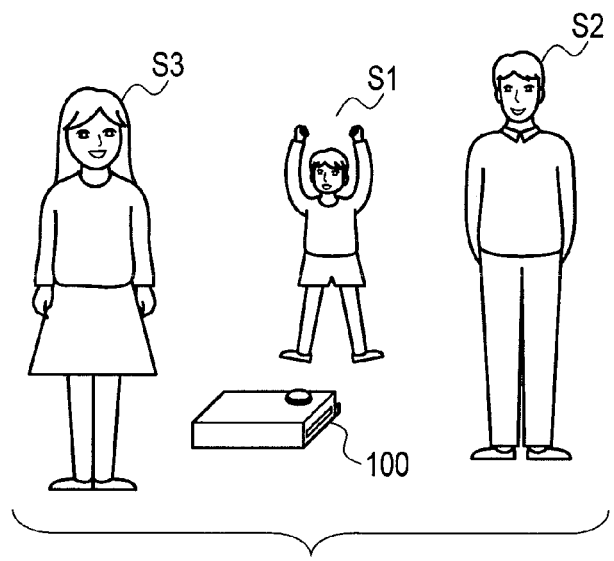
FIG. 22 is a view showing an example of omnidirectional shooting according to the second embodiment.
Figure 23A:
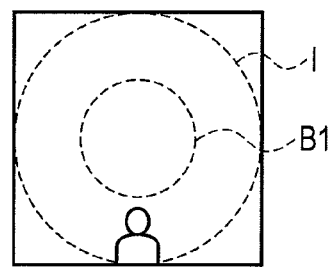
FIGS. 23A and 23B are views showing examples of switching of an annular image trimming range according to the second embodiment.
Figure 23B:
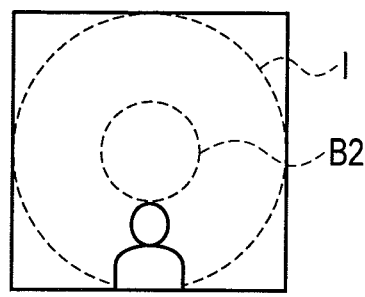

In the second embodiment, when omnidirectional shooting as shown in FIG. 22 is performed, image conversion processing of converting circular image data obtained by the shooting into strip-shaped image data can be performed. In the second embodiment, the image data trimming range when generating strip-shaped image data may be changed. For example, FIG. 23A is a view showing an example in which an annular trimming range is set such that the outer circumference matches the image circle I, the inner circumference has a predetermined length B1. FIG. 23B is a view showing an example in which an annular trimming range is set such that the outer circumference matches the image circle I, the inner circumference has a length B2 shorter than B1. For example, when omnidirectional shooting is performed, the sky and the like are included in the central portion of the all-around image data as a high possibility. Hence, the central portion need not always exist. On the other hand, at least the face of an object preferably exists within the annular trimming range. For this reason, the annular trimming range is preferably set in accordance with the presence/absence of a contrast or the presence/absence of a face.

Figure 24A:
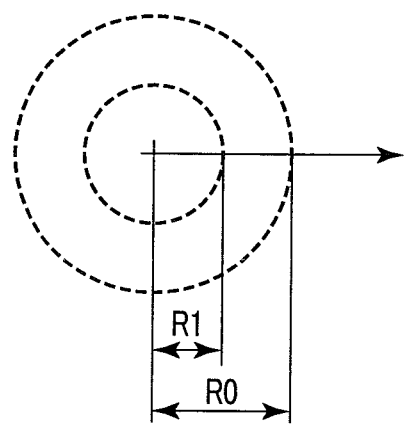
Figure 24B:
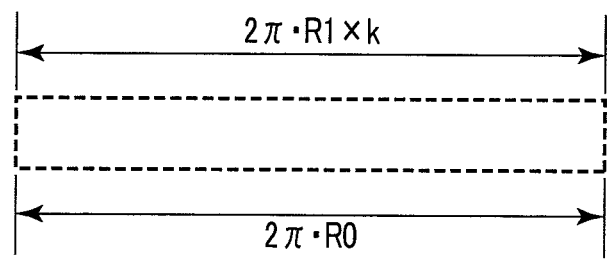

The length of the inner circumference of the annular trimming range is preferably set in accordance with the inner circumference enlargement ratio when generating a strip-shaped image data as well. As shown in FIG. 24A, let R1 be the inner diameter of annular image data, and R0 be the outer diameter. At this time, a length l1 of the inner circumference is $2\pi \times R1$, and a length l0 of the outer circumference is $2\pi \times R0$. In this case, l1<l0. To convert such annular image data into strip-shaped image data, the inner circumference side needs to be enlarged by an enlargement ratio k (=R0/R1), as shown in FIG. 24B. A known method such as linear interpolation is used for enlargement. In general, the image quality degrades as the enlargement ratio increases. For this reason, if only the inner circumference side is enlarged at a large enlargement ratio, the image quality difference between the upper side and the lower side of the strip-shaped image data becomes large. This may give a sense of incongruity to the user. To prevent this, an upper limit is set for k, and the length of the inner circumference is set so as to include an object enlarged at the enlargement ratio k under upper limit. The upper limit is set to, for example, k=2 for an elevation angle of 45° as shown in FIG. 24C.

As described above, in this embodiment, the same effects as in the first embodiment can be obtained using not a plurality of optical systems but a fisheye optical system. Note that the techniques described in the first and second embodiments are applicable not only to cameras (image capturing apparatuses) for household and professional use but also to display-oriented display apparatuses such as a safety check apparatus, a mobile monitoring apparatus, and an inspection apparatus, as a matter of course.

Third Embodiment

The third embodiment of the present invention will be described next. FIG. 25 is a block diagram showing the arrangement of an image capturing apparatus including a manipulation device according to the third embodiment of the present invention. An image capturing apparatus 200 includes a main body 202. The main body 202 includes a shooting unit 204, a communication unit 206, an auxiliary light-emitting unit 208, a control unit 210, a display unit 212, a recording unit 214, a touch panel 216, a manipulation unit 218, an electronic flash 220, a posture determination unit 222, and an external communication unit 224.

The shooting unit 204 includes a shooting optical system 2041 and an image capturing unit 2042. The shooting optical system 2041 includes a plurality of lenses each having the function of an fisheye lens, and captures light in a visual field all around the optical axis. The image capturing unit 2042 generates image data from the light captured by the shooting optical system 2041. The communication unit 206 sends the image data obtained by the image capturing unit 2042 to the control unit 210 by wired or wireless communication.

The auxiliary light-emitting unit 208 emits guide light. When an object is included in the angle of view, the guide light irradiates a predetermined position in the angle of view. The user can visually recognize inclusion of the object in the angle of view by seeing the guide light irradiating within the angle of view. For example, when the guide light is projected to an object at the periphery within the angle of view, the user can visually recognize the angle of view without seeing the display unit 212. The guide light is, for example, a laser beam.

The control unit 210 includes a face detection unit 2101, an image processing unit 2102, a display control unit 2103, an image composition unit 2104, and an auxiliary light control unit 2105. The face detection unit 2101 detects the face portion of a person from image data. The image processing unit 2102 performs image processing such as white balance correction and gamma correction for image data. The display control unit 2103 causes the display unit 212 to display an image based on the image data processed by the image processing unit 2102. The image composition unit 2104 performs tilt correction and trimming of image data. The image composition unit 2104 further composites image data with another image data. The auxiliary light control unit 2105 controls light emission of the auxiliary light-emitting unit 208.

The display unit 212 is an element configured to display an image based on image data under the control of the display control unit 2103. The display unit 212 performs, for example, live view display. In live view display, image data captured by the image capturing unit 2042 is displayed in real time. The display unit 212 includes a liquid crystal display or an organic EL display.

The recording unit 214 records image data processed by the control unit 210. The recording unit 214 includes a memory card or the like. The touch panel 216 detects position information of, for example, a finger that touches the panel, and inputs the detected position information to the control unit 210. The manipulation unit 218 includes manipulation members such as a release button, and inputs information representing the manipulation state of each manipulation member by the user to the control unit 210. The electronic flash 220 emits light when, for example, an object has a low luminance. The posture determination unit 222 detects the posture or a change in the posture of the image capturing apparatus 200. The external communication unit 224 transmits image data to an external apparatus such as the image capturing apparatus 200. Transmission is done via wired communication by a USB or the like or wireless communication by WiFi or the like.

The arrangement of the image capturing apparatus 200 will be described in detail with reference to FIG. 26. FIG. 26 is a front view of the image capturing apparatus 200 according to an embodiment of the present invention. Note that the same reference numerals as in FIG. 25 denote the same components in FIG. 26, and a description thereof will be omitted.

The shooting optical system 2041 specifically includes a fisheye lens 2041a and a low-pass filter 2041b. The fisheye lens 2041a is an optical system configured to capture light in a wide field. The low-pass filter 2041b is configured to remove high frequency noise from light that has entered from the fisheye lens 2041a.

The image capturing unit 2042 specifically includes an image sensor 2042a and an A/D conversion circuit 2042b. The image sensor 2042a converts light that has entered via the fisheye lens 2041a and the low-pass filter 2041b into an analog electrical signal (image signal). The A/D conversion circuit 2042b converts the analog signal obtained by the image sensor 2042a into a digital signal (image data). The image sensor 2042a is mounted on a substrate 2042c. The substrate 2042c is provided with a connector 206a. In addition, a support portion 2042d is formed so as to surround the substrate 2042c. The image sensor 2042a is sealed by the fisheye lens 2041a, the substrate 2042c, and the support portion 2042d.

A flexible printed board 206b is connected to the connector 206a. The flexible printed board 206b is a flexible substrate on which wires configured to transfer image data from the A/D conversion circuit 2042b are printed. The flexible printed board 206b is connected to a connector 206c. The connector 206c is formed on a substrate 210a. The connector 206a connects the substrate 2042c and the flexible printed board 206b to each other. The connector 206c connects the flexible printed board 206b and the substrate 210a to each other. The connector 206a, the flexible printed board 206b, and the connector 206c thus function as an example of the communication unit 206.

The substrate 210a is a printed board configured to mount electronic components. For example, an image processing IC 2102a, a display control IC 2103a, the display unit 212, the touch panel 216, and a power supply circuit 226 are mounted on the substrate 210a as electronic components. The image processing IC 2102a corresponds to the image processing unit 2102, and performs image processing such as white balance correction and gamma correction for image data. The display control IC 2103a corresponds to the display control unit 2103, and causes the display unit 212 to display an image based on the image data. The power supply circuit 226 controls a voltage obtained from a battery 228 and supplies power to operate the image capturing apparatus 200.

The main body 202 incorporates a main capacitor 220a. The main capacitor 220a performs charging to cause the electronic flash 220 to emit light based on a voltage supplied from the power supply circuit 226. A grip portion 202a is formed outside the main body 202. The grip portion 202a is an auxiliary member formed outside the main body 202 to make the user stably hold the image capturing apparatus 200.

Figure 27A:
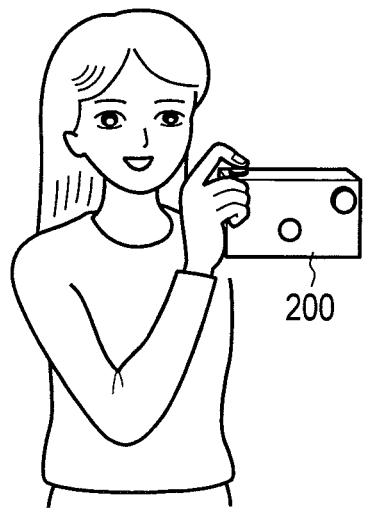
Figure 27B:
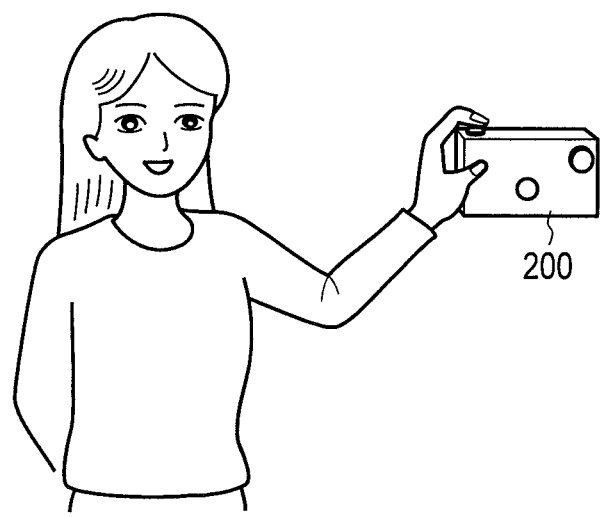

FIGS. 27A, 27B, and 27C illustrate use examples of the image capturing apparatus 200. FIG. 27A shows a use example in which the user performs a release manipulation by the right hand while seeing the display unit 212. That is, FIG. 27A shows an example of normal shooting. FIG. 27B shows an example of wide-angle self-portrait photography. In wide-angle self-portrait photography, the user shoots himself/herself while holding the image capturing apparatus 200 by the left hand without seeing the display unit 212. FIG. 27C shows a use example in which the user performs omnidirectional shooting by facing the optical axis of the fisheye lens to the zenith.

The omnidirectional shooting shown in FIG. 27C will further be described with reference to FIGS. 28A, 28B, and 28C. FIG. 28A is a view showing a state wherein a user H1 shoots a total of three persons including herself and two objects H2 other than the user H1 by omnidirectional shooting. In shooting using a fisheye lens, all the three objects fit in the angle of view. FIG. 28B shows a result of shooting in FIG. 28A. When the image circle of the shooting optical system 2041 is set to be smaller than the image capturing range of the image sensor, a circular shooting result as shown in FIG. 28B is obtained. The circular shooting result shown in FIG. 28B can also be processed to a panoramic image shown in FIG. 28C by image processing. To make the three objects as shown in FIG. 28B fit in the angle of view, the optical axis of the shooting optical system 2041 preferably faces the zenith.

Figure 29A:
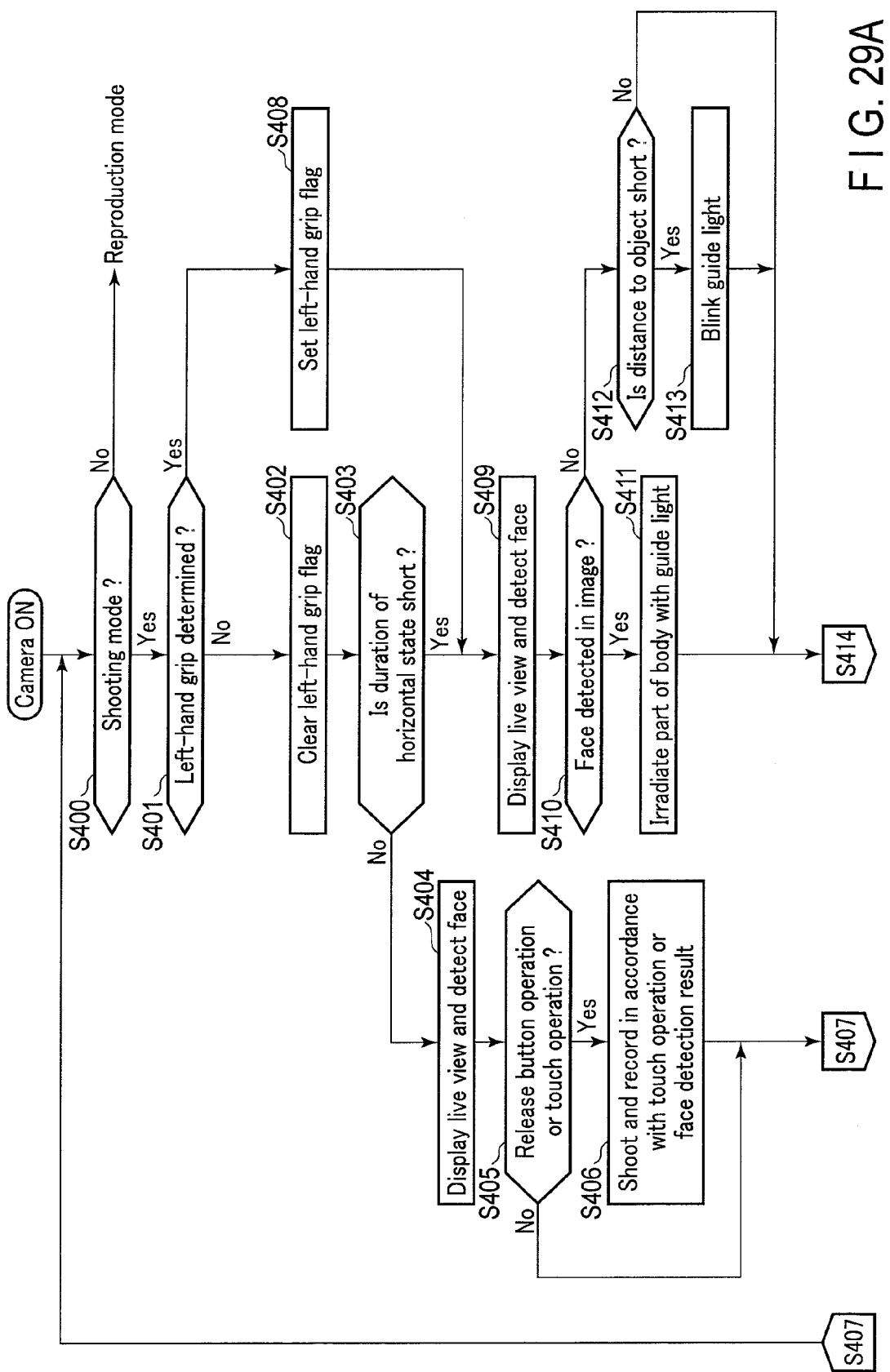
FIGS. 29A and 29B are flowcharts for explaining the operation of the image capturing apparatus.
Figure 29B:
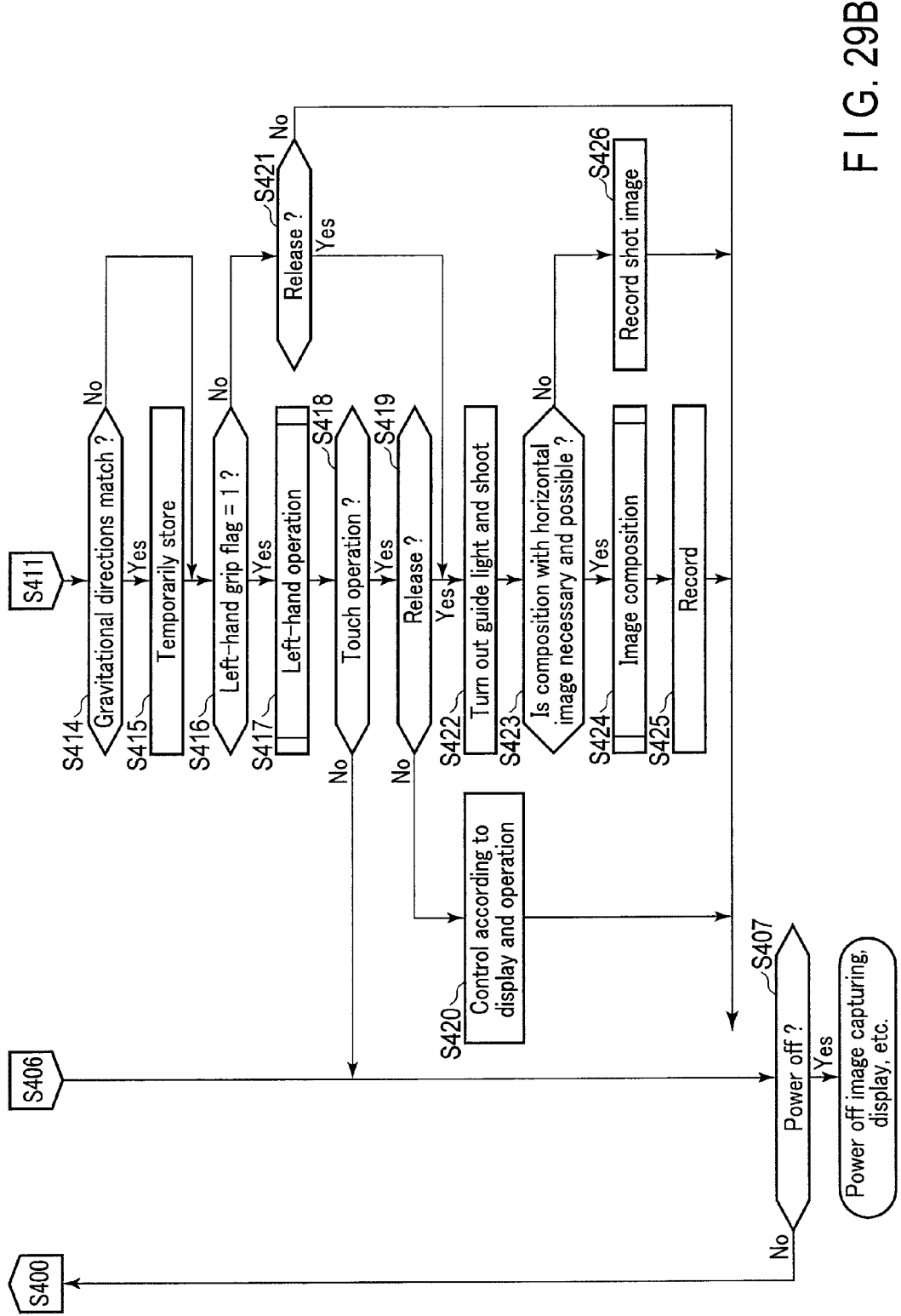

The operation of the image capturing apparatus 200 will be described with reference to the flowchart of FIGS. 29A and 29B. When the image capturing apparatus 200 is powered on, the control unit 210 determines whether a shooting mode is selected by the user (step S400). Upon determining that the shooting mode is selected, the control unit 210 determines whether the user is gripping the image capturing apparatus 200 by the left hand (step S401).

An example of a situation where the image capturing apparatus is gripped by the left hand will be described using examples of shooting during rock climbing shown in FIGS. 30A and 30B. Referring to FIG. 30A, the user holds on to the bare rock by the left hand, and holds the image capturing apparatus 200 by the right hand. At this time, the user can easily perform shooting using the release button or the like. On the other hand, in FIG. 30B, the user holds on to the bare rock by the right hand, and therefore holds the image capturing apparatus 200 by the left hand. Shooting is difficult because the release button of the image capturing apparatus 200 is often disposed at a position difficult to manipulate by the left hand.

Figure 31:
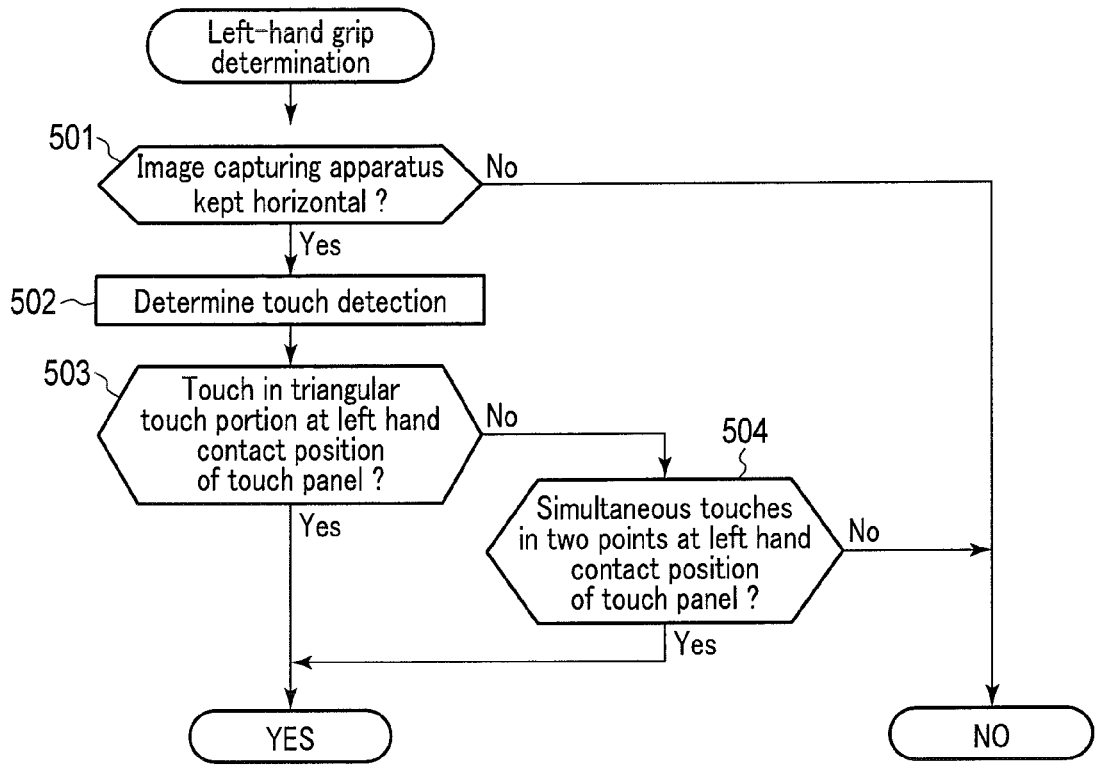
FIG. 31 is a flowchart for explaining details of left-hand grip determination.
Figure 32A:
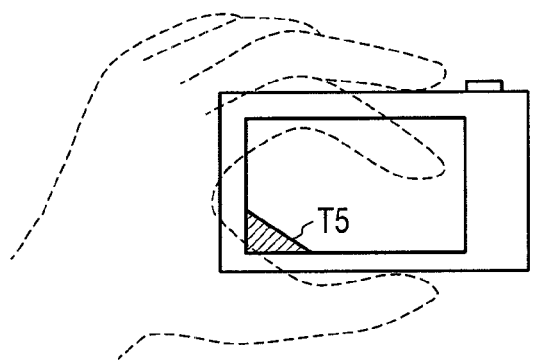
FIGS. 32A and 32B are views for explaining details of left-hand grip determination.

Details of processing of determining whether the image capturing apparatus 200 is held by the left hand will be described. FIG. 31 is a flowchart for explaining details of left-hand grip determination. First, the control unit 210 determines whether the image capturing apparatus 200 is kept horizontally (step S501). That is, upon determining that the image capturing apparatus is horizontal, the control unit 210 determines that the user is going to shoot. On the other hand, upon determining that the image capturing apparatus is not horizontal, the control unit 210 determines that the user is not going to shoot. Upon determining in step S501 that the image capturing apparatus 200 is kept horizontally, the control unit 210 starts detecting the touch position on the touch panel 216 (step S502). After detecting the touch position on the touch panel 216, the control unit 210 determines whether a touch in a triangular touch portion T5 of the touch panel 216 shown in FIG. 32A, which is assumed to be a portion that the user's left hand contacts when the user grips the image capturing apparatus 200 by the left hand, is detected (step S503). In step S503, it is determined whether a touch is detected. However, in the determination of step S503, a touch may be determined even when a touch is not strictly detected. For example, in the touch panel 216 of an optical or electrostatic capacitance type, a touch is detected when the distance between an object (a finger or part of a hand) and the touch panel falls within a predetermined range even if the object is not in contact. A touch on the triangular touch portion T5 is determined because the user readily grips an end of the image capturing apparatus 200, as shown in FIG. 32A, when he/she grips the image capturing apparatus 200 while having an intention to see display on the display unit 212. The screen of a display unit recently tends to become larger. When gripping the image capturing apparatus 200 including a display unit with such a large screen, a user grips the periphery of the display unit. At this time, when considering seeing display on the display unit 212, the user is easily expected to grip an end of the display unit. Even when not considering seeing display on the display unit 212, a user who does not like fingerprints or finger marks at the center of the display unit is assumed to grip an end of the display unit instead of grabbing it. Hence, user's grip can easily be determined by determining a touch in the triangular touch portion T5.

Figure 32B:
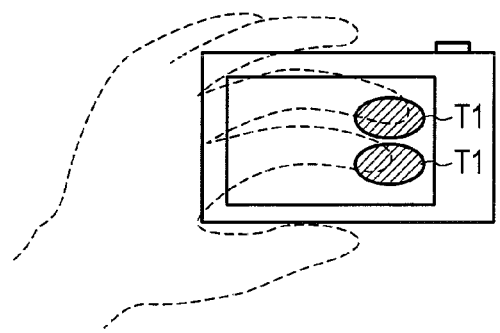

Upon determining in step S503 that a touch in the triangular touch portion T5 is detected, the control unit 210 determines that the image capturing apparatus 200 is gripped by the left hand. Upon determining in step S503 that no touch in the triangular touch portion T5 is detected, the control unit. 210 determines whether simultaneous touches in two touch portions T1 on the touch panel 216 shown in FIG. 32B, which are assumed to be portions that the user's fingers contact when the user grips the image capturing apparatus 200 by the left hand in another form, are detected (step S504). In step S504, it is determined whether touches on the two touch portions T1 are detected. The reason why touches on the two touch portions T1 are determined will be explained. For example, assume that the image capturing apparatus is gripped by the thumb and the little finger (in this case, the index finger, middle finger, and ring finger are placed on the screen, and these fingers are usable for the touch manipulation). Since it is difficult to apply a force by the little finger, the user can hardly stably grip the image capturing apparatus 200. By the thumb and the middle finger, the user can stably grip the image capturing apparatus 200. In this case, however, the user can move only the index finger. If only the index finger is movable, the screen of the display unit 212 is hard to see. On the other hand, by the thumb and the ring finger (in this case, the index finger and the middle finger are placed on the screen of the display unit 212, and these fingers are usable for the touch manipulation), the user can stably grip the image capturing apparatus 200. Additionally, in the two-point touch by the index finger and the middle finger, the user can easily visually recognize the screen of the display unit 212 by bending or opening the two fingers. The two touch portions T1 are configured to detect such grip by the thumb and the middle finger. The triangular touch portion T5 is configured to detect grip by the middle finger and the thumb. In this case, one-point touch using the index finger is detected. However, the user lightly grips the image capturing apparatus 200 and can therefore confirm the screen of the display unit 212.

Upon determining in step S504 that simultaneous touches in the two touch portions T1 on the touch panel 216 are detected, the control unit 210 determines that the image capturing apparatus 200 is gripped by the left hand.

Upon determining in step S501 that the image capturing apparatus 200 is not kept horizontally, that is, the image capturing apparatus 200 tilts, the control unit 210 determines that the image capturing apparatus 200 is not gripped by the left hand. Upon determining in step S504 that simultaneous touches in the two touch portions T1 on the touch panel 216 are not detected, the control unit 210 determines that the image capturing apparatus 200 is not gripped by the left hand.

In this embodiment, a manipulation in left-hand grip has been exemplified. The technique of this embodiment is also applicable to right-hand grip. For example, right-hand grip that makes pressing the release button difficult can be detected by setting touch portions. The positions of the touch portions in right-hand grip are reverse to, for example, those in left-hand grip concerning the left/right direction. Alternatively, touch portions may be set in correspondence with grip by a hand or a foot of, for example, a handicapped person. That is, touch portions may be set in accordance with a specific grip manner liked by the user, and the specific grip may be detected from the distribution of touch positions.

Referring back to FIGS. 29A and 29B, upon determining in step S401 that the image capturing apparatus 200 is gripped by the right hand, the control unit 210 clears a left-hand grip flag to 0 (step S402). After clearing the left-hand grip flag to 0, the control unit 210 determines whether the duration of the optical axis horizontal state is shorter than a predetermined time (step S403). Upon determining in step S403 that the duration of the horizontal state is not shorter than the predetermined time, the control unit 210 causes the display unit 212 to display a live view. In addition, the control unit 210 performs face detection (step S404).

The control unit 210 determines whether the release button or the touch panel 216 is manipulated, that is, whether a release manipulation is performed (step S405). Upon determining in step S405 that the release button or the touch panel 216 is not manipulated, the control unit 210 advances the process to step S407. Upon determining in step S405 that the release button or the touch panel 216 is manipulated, the control unit 210 adjusts the focus and exposure for the touch portion on the touch panel 216 or a face portion detected as the result of face detection, performs shooting, and records image data obtained by the shooting in the recording unit 214 (step S406).

After step S405 or S406, the control unit 210 determines whether the user powers off the image capturing apparatus (step S407). Upon determining in step S407 that the image capturing apparatus is powered off, the control unit 210 ends the processing. Upon determining in step S407 that the image capturing apparatus is not powered off, the control unit 210 returns the process to step S400.

Upon determining in step S401 that the image capturing apparatus 200 is gripped by the left hand, the control unit 210 sets the left-hand grip flag to 1 (step S408). After that, the control unit 210 advances the process to step S409. After setting the left-hand grip flag to 1 in step S408 or upon determining in step S403 that the duration of the horizontal state is shorter than the predetermined time, the control unit 210 causes the display unit 212 to display a live view. In addition, the control unit 210 performs face detection (step S409). After that, the control unit 210 determines whether a face is detected from the image data (step S410). Upon determining that a face is detected from the image data, the control unit 210 causes the auxiliary light-emitting unit 208 to irradiate part of the body of the object with guide light (step S411).

Figure 33A:
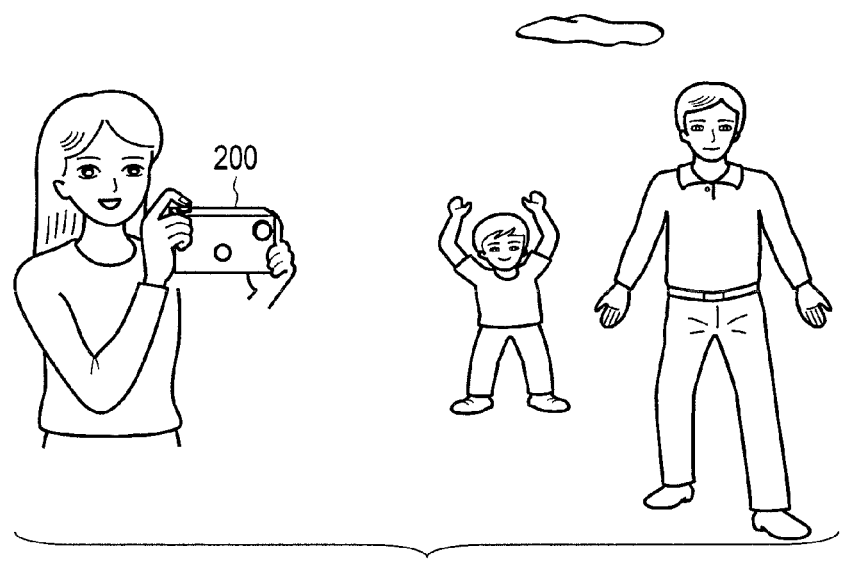
FIGS. 33A, 33B, 33C, and 33D are views for explaining the effect of guide light.
Figure 33B:
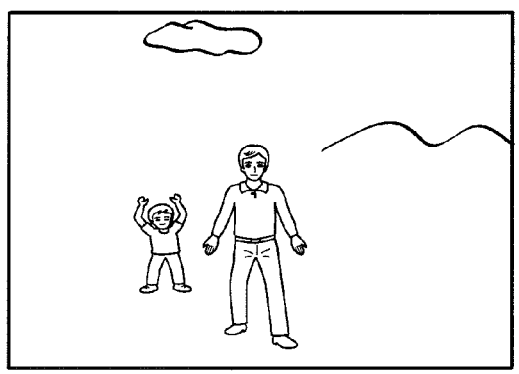
Figure 33C:
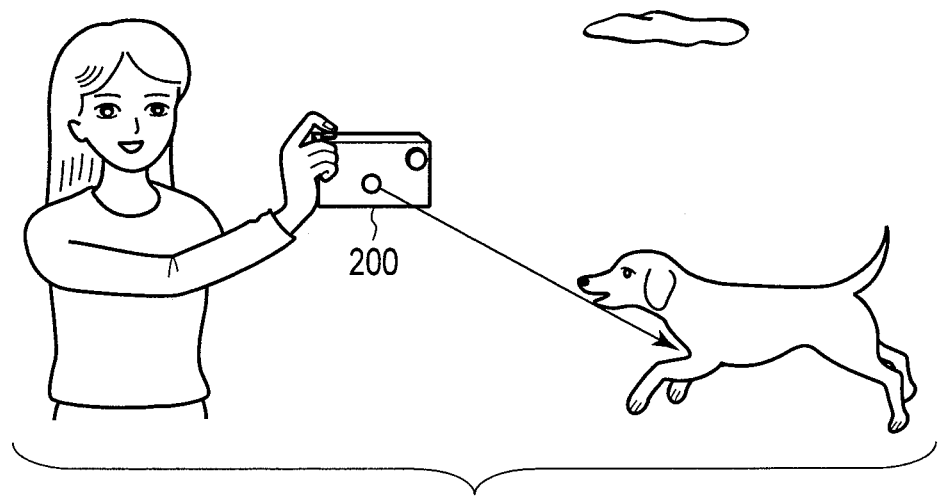
Figure 33D:
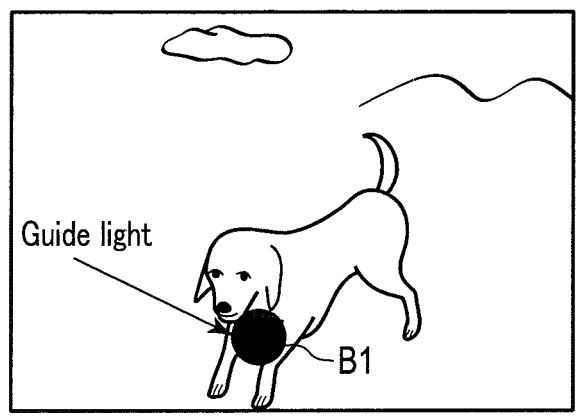

The effect of guide light will be described here with reference to FIGS. 33A, 33B, 33C, and 33D. By seeing the guide light, the user can easily visually recognize that the object fits in the angle of view without seeing the display unit 212. Light used as guide light has directivity. For example, a laser beam is used as guide light. When the guide light irradiation position is limited to objects other than the face in the angle of view, the guide light does not directly enter the eye of the object. In FIG. 33A, the user can see a live view displayed on the display unit 212. Hence, the user can easily fit the objects in the angle of view, as indicated by the shooting result shown in FIG. 33B. On the other hand, FIG. 33C shows a situation where the user can hardly confirm whether the object fits in the angle of view by seeing a live view. In this situation, to notify the user that the object fits in the angle of view, guide light irradiates part of the object, as indicated by B1 in FIG. 33D.

Note that the irradiation position of the guide light aiming at notifying that an object fits in the angle of view is not limited to part of the body of the object, and may be a position corresponding to an end of the angle of view. The user can confirm the angle of view, the position of the user in the angle of view, and the like by confirming the guide light that irradiates both ends of the angle of view without seeing the display unit 212. When another object such as a wall or a building that receives the guide light irradiation exists on the upper or left/right side of the object, the control unit 210 irradiates the object that receives the light irradiation.

Referring back to FIGS. 29A and 29B, upon determining in step S410 that no face is detected from the image data, the control unit 210 determines whether the distance between the object and the image capturing apparatus 200 is shorter than a predetermined distance (step S412). The predetermined distance is, for example, 3 m. Upon determining in step S412 that the distance between the object and the image capturing apparatus 200 is shorter than the predetermined distance, the control unit 210 irradiates the object with blinking guide light to notify the user that the object does not fit in the angle of view (step S413).

Next, the control unit 210 determines whether the gravitational direction of the image capturing apparatus 200 matches the gravitational direction of the image data obtained for the live view (step S414). Upon determining in step S414 that the gravitational direction of the image capturing apparatus 200 matches the gravitational direction of the image data obtained for the live view, the control unit 210 temporarily stores the image data in a storage unit (not shown) (step S415). The temporarily stored image data is used to composite an image, as will be described later. The temporarily stored image data corresponds to horizontal image data. Upon determining in step S414 that the gravitational directions do not match, the control unit 210 does not temporarily store the image data. In this case, the temporarily stored image data is assumed to be acquired immediately before shooting. However, the image data used for temporary storing need only be the latest image data acquired after shooting by the user. That is, the image data may be image data acquired immediately after shooting. For example, it may be image data temporarily stored one frame after shooting.

Next, the control unit 210 determines whether the left-hand grip flag is set to 1 (step S416). Upon determining in step S416 that the left-hand grip flag is set to 1, that is, upon determining that the image capturing apparatus 200 is gripped by the left hand, the control unit 210 performs left-hand manipulation processing according to the touch detection position (step S417).

Figure 34:
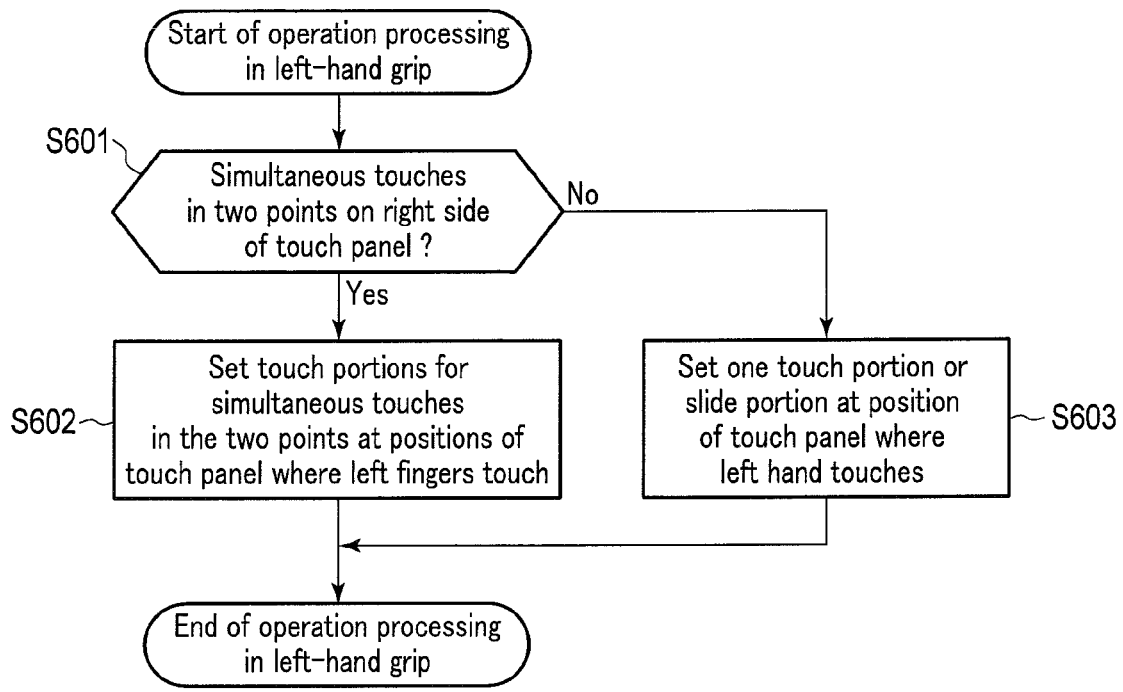
FIG. 34 is a flowchart for explaining an operation of determining a left-hand manipulation.
Figure 35A:
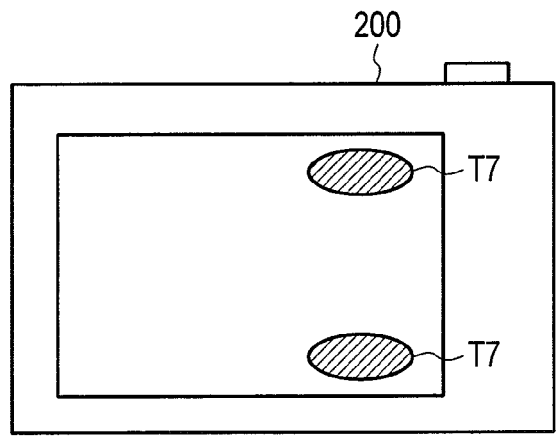

The left-hand manipulation processing will be described. FIG. 34 is a flowchart for explaining the left-hand manipulation processing. Referring to FIG. 34, the control unit 210 determines whether simultaneous touches in two portions on the touch panel 216 are detected (step S601). Upon determining in step S601 that simultaneous touches in two portions on the touch panel 216 are detected, the control unit 210 provides release touch portions T7 used to perform a release manipulation by detecting simultaneous touches in two portions at positions different from the touch portions T1, as shown in FIG. 35A (step S602). For example, the release touch portions T7 are provided at positions closer to ends of the touch panel 216 than the touch portions T1. In this embodiment, the touch portions for the manipulation in left-hand grip are provided within the reach of the fingers assumed to be touching the touch portions determined for left-hand grip. That is, since the touch portions are not provided outside the reach of the fingers, operation errors caused by press of regions other than the touch portions against the user's will decrease.

Upon determining in step S601 that simultaneous touches in two portions on the touch panel 216 are not detected, that is, touches in a single portion are detected, the control unit 210 provides a release touch portion T2, an enlarged live view slide portion T3, an exposure correction slide portion T4, and a triangular touch portion T6 in a range of the touch panel 216 where the fingers of the left hand of the user can contact, as shown in FIG. 35B (step S603). The release touch portion T2 is a touch portion at one point used by the user to perform a release manipulation by touching with a finger of the left hand. The enlarged live view slide portion T3 is a touch portion used by the user to perform an enlarged live view manipulation by sliding a finger. The enlarged live view manipulation indicates an operation of enlarging a partial region of image data displayed as a live view and displaying the enlarged region as a live view. This manipulation is effective in apparatuses other than shooting equipment, which need to view an enlarged object. The exposure correction slide portion T4 is a touch portion used by the user to perform an exposure correction manipulation by sliding a finger. The triangular touch portion T6 is a touch portion provided at a position different from the touch portion T5 and used by the user to perform a predetermined manipulation by touching.

When providing the touch portion T2, T3, T4, T6, or T7 on the touch panel 216, the display unit 212 may display an image corresponding to each touch portion so that the user can easily visually recognize it. For example, the display unit 212 displays an ellipse as shown in FIG. 35A or 35B or displays an arrow-shaped image as shown in FIG. 35B.

A general operation like exposure correction concerning visual recognition of an object, for example, focus correction may be done by a touch. Even when the user is touching the triangular touch portion T6 of the touch panel 216 by a finger of the left hand, he/she can confirm an image displayed at the center of the display unit 212. That is, the manipulation device according to the embodiment of the present invention is an intuitive user interface (UI) that effectively uses, as display positions, regions of the touch panel 216 other than the region gripped by the hand.

The positions of the touch portions are decided considering a condition that no finger overlaps the image displayed on the display unit 212 and a condition that the user can naturally touch the touch portions by fingers. For example, even if a finger for a touch overlaps the image on the display unit 212, the region of a manipulation touch portion may allow the user to confirm the image by bending or opening the finger. That is, the position of the region of a manipulation touch portion that a user's finger can naturally touch changes depending on the finger used for the touch to the manipulation touch portion and also in consideration of the structure of the hand and the movable range of the hand. Some fingers of the grip hand are used for grip, and the remaining fingers are used for manipulations. Upon determining that the image capturing apparatus 200 is held by special grip, the control unit 210 determines the distribution of touch positions on the touch panel 216, thereby determining which fingers are used for grip. Note that in the embodiment of the present invention, touch portions that are used when the image capturing apparatus is gripped by the left hand have been described. However, the touch portions according to this embodiment may correspond to not only a touch by the left hand but also a touch by another body part. For example, when the user grabs the equipment, and the control unit 210 determines that no finger is usable for a manipulation, a touch portion considering a touch by the nose or another limb of the user may newly be provided.

Referring back to FIGS. 29A and 29B, after step S417, the control unit 210 determines whether a touch manipulation is performed on the touch panel 216 (step S418). Upon determining in step S418 that no touch manipulation is performed, the control unit 210 advances the process to step S407.

Upon detecting a touch in a touch portion in step S418, that is, upon determining that the touch panel 216 is pressed by a finger, or a slide manipulation as shown in FIG. 35C is performed, the control unit 210 determines whether the manipulation is a release manipulation (step S419). Upon determining in step S419 that the manipulation is a release manipulation, the control unit 210 determines that a release manipulation by the left hand is performed by the user. On the other hand, upon determining in step S419 that the manipulation is not a release manipulation, the control unit 210 performs control such as enlarged live view or exposure correction in accordance with the pressed touch portion (step S420).

Upon determining in step S416 that the left-hand grip flag is not 1, that is, the user grips the image capturing apparatus 200 by the right hand, the control unit 210 determines whether a release manipulation using the release button is performed (step S421).

When a release manipulation is performed in step S419 or S421, the control unit 210 turns off guide light irradiating the object. After that, the control unit 210 performs shooting (step S422).

After shooting, the control unit 210 determines whether it is necessary and possible to composite image data obtained by temporary storage and image data obtained by shooting (step S423). A situation where composition is necessary is a situation where the gravitational direction at the time of shooting does not match the gravitational direction of image data. A situation where composition is possible is a situation where, for example, image data determined as usable for composition is included in the temporarily stored image data group. Image data determined as usable for composition is image data similar to the image data that needs to be composited, for example, image data shot immediately before or after the image data that needs to be composited. Upon determining in step S423 that it is necessary and possible to composite temporarily stored image data and image data obtained by shooting, the control unit 210 composites the image data (step S424).

Figure 36C:
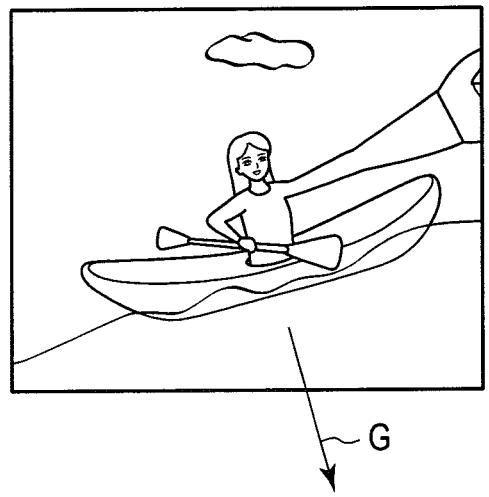
Figure 36D:
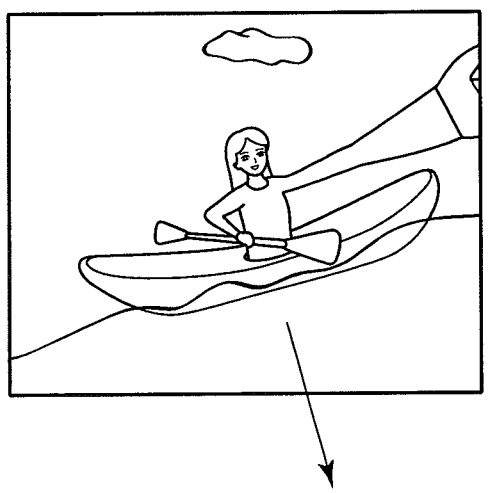

Details of image data composition will be described. FIGS. 36A, 36B, 36C, 36D, 36E, 36F, 36G, 36H, 36I, 36J, 36K, and 36L illustrate situations where the user in a canoe shoots herself as examples of situations where image data composition is necessary. In the example of FIG. 36A, the user holds the paddle by the right hand and manipulates the image capturing apparatus by the left hand. In an ideal shooting result in the situation of FIG. 36A, the gravitational direction at the time of shooting matches the gravitational direction of the image data, as shown in FIG. 36B. However, since the situation is unstable, as described above, a shooting result in which the gravitational direction at the time of shooting do not match the gravitational direction of the image data, as shown in FIG. 36C, is often obtained. In this case, the image capturing apparatus 200 performs composition such that the image data obtained at the time of shooting in which the gravitational direction at the time of shooting do not match the gravitational direction of the image data can be acquired as image data in which the gravitational direction at the time of shooting matches the gravitational direction of the image data.

Figure 36E:
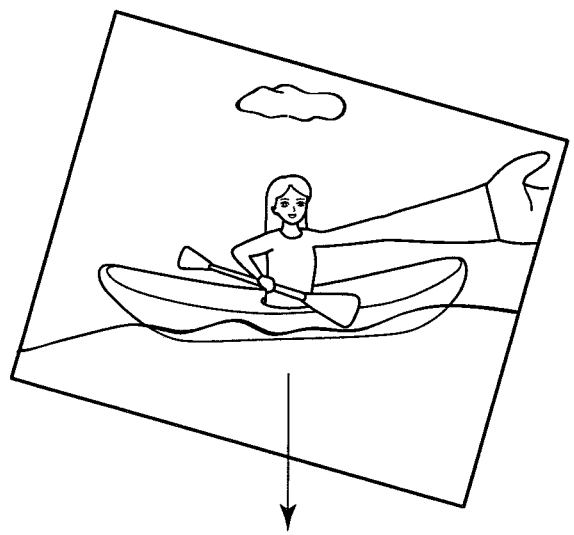
Figure 36F:
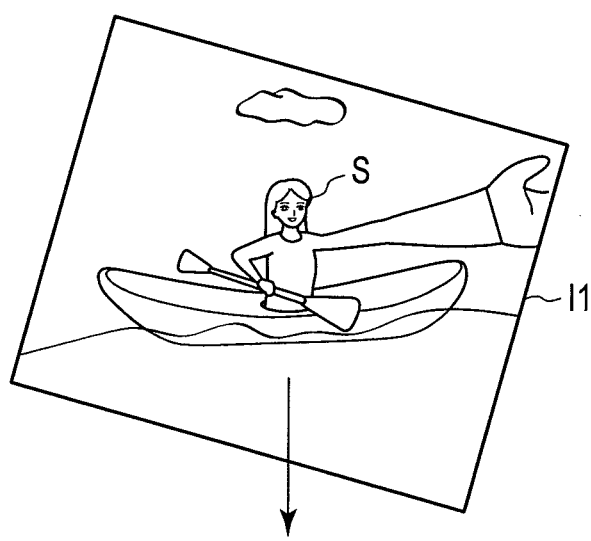
Figure 36G:
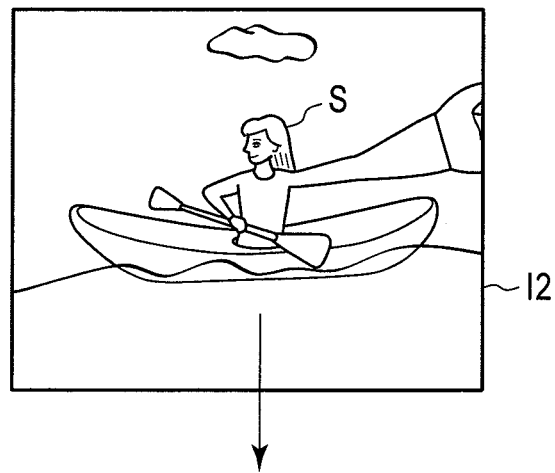
Figure 36H:
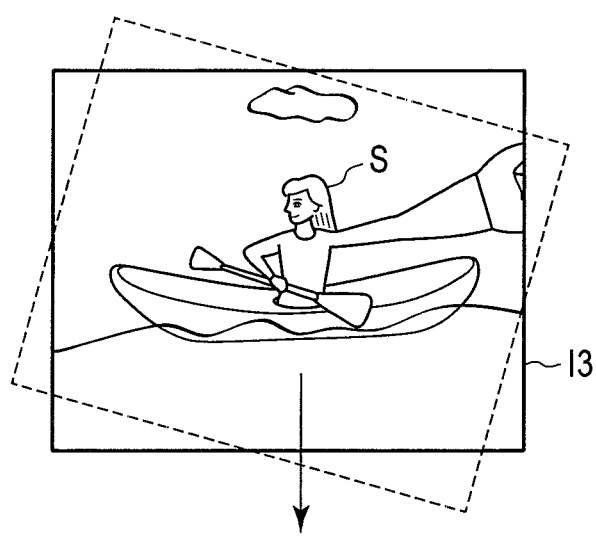
Figure 36K:
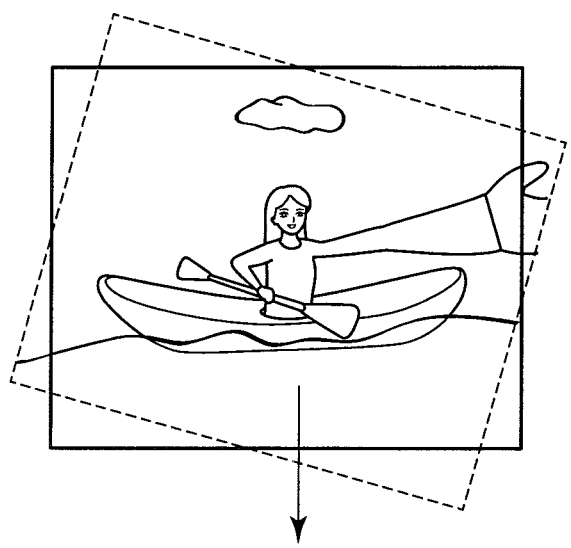
Figure 36L:
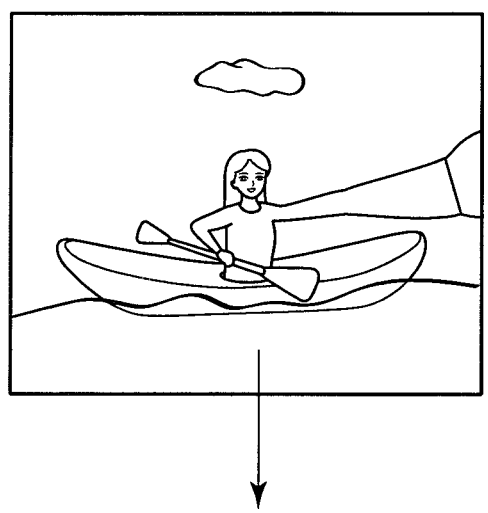
Figure 37:
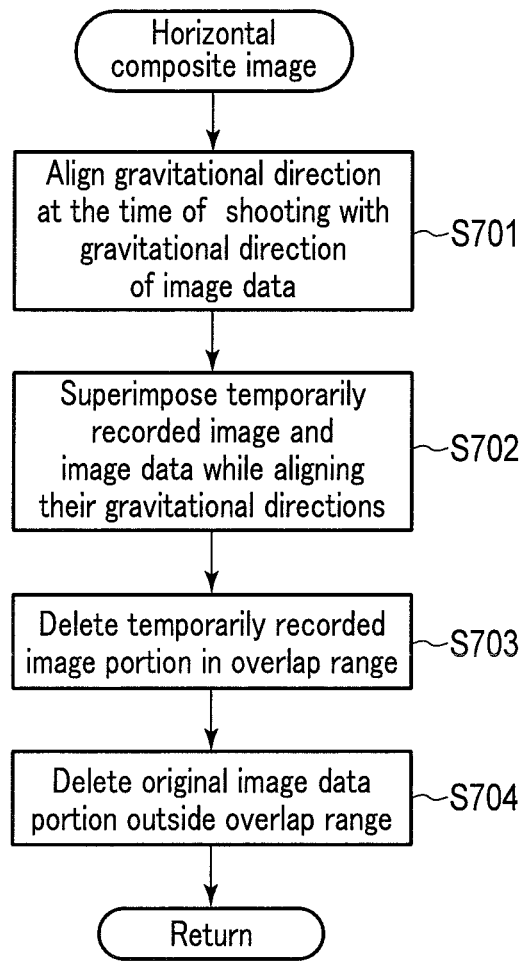
FIG. 37 is a flowchart for explaining details of image data composition.

FIG. 37 is a flowchart showing image data composition. Referring to FIG. 37, the control unit 210 matches the gravitational direction (G in FIG. 36C) of image data obtained at the time of shooting with the gravitational direction (for example, downward direction) at the time of shooting (step S701). To do this, the control unit 210 tilts the image data shown in FIG. 36D, in which the gravitational direction of the image data is different from the gravitational direction at the time of shooting, in a manner as shown in FIG. 36E. Next, the control unit 210 superimposes tilted shot image data I1 and temporarily stored horizontal image data I2 such that the degree of matching between the two image data is maximized, as shown in FIG. 36F, thereby obtaining composite image data I3 shown in FIG. 36H (step S702). For example, superimposition is performed such that the positions of person portions S match between the image data I1 and the image data I2. After superimposing the image data, the control unit 210 deletes a horizontal image data portion existing in the overlap portion between the horizontal image data and the shot image data, as shown in FIG. 36I (step S703). For example, as shown in FIG. 36J, when the horizontal image data of the person portion S is deleted, only the shot image data remains for the person portion S. As shown in FIG. 36K, the control unit 210 trims the composite image data into a rectangular shape (step S704). After that, the processing of FIG. 37 ends. For example, in FIG. 36L, the portion indicated by the broken line is deleted, and final composite image data is obtained.

Referring back to FIGS. 29A and 29B, after step S424, the control unit 210 records the image data obtained by composition in the recording unit 214 (step S425). After that, the control unit 210 advances the process to step S407.

Upon determining in step S423 that composition is unnecessary or impossible, the control unit 210 directly records the image data obtained by shooting in the recording unit 214 (step S426). After that, the control unit 210 advances the process to step S407.

As described above, the image capturing apparatus 200 according to the third embodiment first determines whether the image capturing apparatus 200 is held by the left hand. Upon determining that a manipulation is performed by the left hand, the control unit 210 provides touch portions corresponding to the manner of grip by the left hand on the touch panel 216. The user can easily perform manipulations by the left hand by manipulating the touch portions corresponding to the manner of grip.

The embodiment of the present invention is not limited to an image capturing apparatus as long as the apparatus is a manipulation device that enables manipulations using a touch panel. For example, the embodiment may be applied to various kinds of manipulation devices such as a remote controller which the user wants to grip and manipulate without removing the hand from it. The embodiment may also be applied to a manipulation device having the grip portion of a manipulation member in a control box or stationary equipment used in the field of industrial equipment or medical equipment. The embodiment may also be applied to a manipulation device that needs a blind manipulation, like car-mounted equipment. In the embodiment of the present invention, the posture of the manipulation device and a face detection result obtained by image capturing have been described. The posture of the manipulation device may include the tilt of a lever and the direction in which a remote controller faces. The object detected by image capturing is not limited to a face. An object or equipment itself displayed on a monitor screen in the direction in which a remote controller or a control box faces may be detected. The present invention may be effective for equipment that assumes a manipulation according to confirmation of a display unit and a touch on the display unit. Hence, the present invention belongs to a manipulation device.

The image capturing apparatus 200 according to the third embodiment performs image processing of non-horizontal image data obtained by shooting so as to obtain horizontal image data. That is, the image capturing apparatus 200 tilts the image to correct the horizontal direction of the non-horizontal image data. In addition, the image capturing apparatus 200 composites the tilted image data and another horizontal image data. Image data in which the tilt is corrected, and a shortage caused by the correction is compensated for is thus provided.

Image data need not always be obtained by shooting as long as it has a predetermined gravitational direction. Hence, the present invention belongs to an image processing apparatus. Note that the present invention may be usable for equipment for which horizontally displaying an image is important particularly in the field of industrial equipment or medical equipment. For example, equipment used while being held by the hand of a person, such as a handy measurement device that displays an image, may be required to perform image processing of correcting the horizontalness of an image. This image processing allows the user to always see an image displayed on the handy measurement device in a horizontal state. In car-mounted equipment configured to acquire an image by shooting a scene outside a car, the image may tilt in accordance with the tilt of the road. In this case, image processing is assumed to be performed to correct the tilt of the road shot by the car-mounted equipment to obtain a horizontal state. The image processed by the car-mounted equipment is used to, for example, cause the driver to immediately determine the situation outside the car. On the other hand, stationary equipment that is horizontal by itself may be applied to perform image processing of setting the object of the equipment in the horizontal state even when an image in which the object is not in the horizontal state is acquired.

Upon determining that an object fits in the angle of view, the image capturing apparatus 200 according to the third embodiment irradiates, with guide light, a position in the angle of view where the face portion of the object is not included. Even in a situation where the display unit 212 is difficult to see, the user visually recognizes the guide light, thereby visually recognizing that the object fits in the angle of view. This guide light is applicable not only to the image capturing apparatus but also to the manipulation member of specific equipment such as the remote controller of equipment. For example, the apparatus may be applied as an image capturing apparatus that projects guide light as a warning representing that a remote controller does not face its main body equipment. The guide light serving as a warning is projected toward the main body equipment and therefore does not directly enter a human eye. The guide light may be applied, like a remote controller, to the manipulation portion of a control box or stationary equipment, for example, the manipulation member of industrial equipment or medical equipment, which is manipulated while seeing the display unit. Alternatively, when the apparatus is applied as an image capturing apparatus that projects a guide or warning for equipment manipulation onto a projection surface as characters, a farsighted or presbyopic user can discriminate the warning or guide by seeing character light projected in a large size. Furthermore, if the guide light is applied to car-mounted equipment that needs a blind manipulation, the user can immediately determine the manipulation of the car-mounted equipment by seeing display of guide light.

The posture of equipment and a face detection result obtained by image capturing have been described. The posture of the image capturing apparatus may include the tilt of a lever and the direction in which a remote controller faces. The object used by image capturing is not limited to a face. An object or equipment itself displayed on a monitor screen in the direction in which a remote controller or a control box faces may be detected. The apparatus may also be applicable to virtually display a guide indication on manipulation equipment. The present invention is applicable to equipment that assumes a manipulation according to confirmation of a display unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus comprising:
   an optical system configured to form an image of a light beam from an object;
   an image capturing unit configured to obtain image data corresponding to the light beam by the optical system;
   a posture detection unit configured to detect a posture of the image capturing apparatus; and
   a control unit configured to determine based on the posture whether the image capturing apparatus is in a mode to perform shooting in a state in which an optical axis of the optical system faces a zenith or in a mode to perform shooting in a state in which the optical axis of the optical system faces a photographer side, and change control in a shooting operation using the image capturing unit in accordance with a result of the determination, wherein upon determining that the image capturing apparatus is in the mode to perform shooting in the state in which the optical axis of the optical system faces the zenith, the control unit controls to record, in a recording unit, one of annular image data and circular image data obtained by the image capturing unit, and upon determining that the image capturing apparatus is in the mode to perform shooting in the state in which the optical axis of the optical system faces the photographer side, the control unit controls to record, in the recording unit, rectangular image data obtained by the image capturing unit.

2. The apparatus according to claim 1, further comprising an image conversion processing unit configured to convert one of the annular image data and the circular image data into strip-shaped image data.

3. The apparatus according to claim 1, further comprising:
   a first electronic flash having a light-emitting direction parallel to the optical axis of the optical system; and
   a second electronic flash having a light-emitting direction perpendicular to the optical axis of the optical system,
   wherein upon determining that the image capturing apparatus is in the mode to perform shooting in the state in which the optical axis of the optical system faces the zenith and light emission of the electronic flash is necessary, the control unit causes the second electronic flash to emit light, and upon determining that the image capturing apparatus is in the mode to perform shooting in the state in which the optical axis of the optical system faces the photographer side and light emission of the electronic flash is necessary, the control unit causes the first electronic flash to emit light.

4. The apparatus according to claim 1, further comprising a touch panel,
   wherein upon determining that the image capturing apparatus is in the mode to perform shooting in the state in which the optical axis of the optical system faces the photographer side and a touch portion detected on the touch panel is a predetermined position, the control unit changes a setting of the touch panel so as to execute the shooting in accordance with a manipulation on the touch panel.

5. The apparatus according to claim 4, further comprising a power supply control unit configured to power on or off the image capturing apparatus in accordance with a change in the posture of the image capturing apparatus detected by the posture detection unit.

6. The apparatus according to claim 1, wherein the optical system includes a first optical system, and a second optical system having a field wider than in the first optical system, and
the image capturing unit includes a first image capturing unit corresponding to the first optical system, and a second image capturing unit corresponding to the second optical system.

7. The apparatus according to claim 6, further comprising an image composition processing unit configured to composite image data obtained by the first image capturing unit and image data obtained by the second image capturing unit.

8. The apparatus according to claim 7, wherein when parts of a person divisionally exist in the first image data and the second image data, the control unit causes the image composition processing unit to execute composition.

9. A computer-implemented method for use with an image capturing apparatus including an optical system configured to form an image of a light beam from an object, an image capturing unit configured to obtain image data corresponding to the light beam by the optical system, and a posture detection unit configured to detect a posture of the image capturing apparatus, the computer-implemented method comprising:
determining, based on the posture, whether the image capturing apparatus is in a mode to perform shooting in a state in which an optical axis of the optical system faces a zenith or in a mode to perform shooting in a state in which the optical axis of the optical system faces a photographer side;
changing control in a shooting operation using the image capturing unit in accordance with a result of the determination;
controlling, responsive to a determination that the image capturing apparatus is in the mode to perform shooting in the state in which the optical axis of the optical system faces the zenith, a recording unit to record one of annular image data and circular image data obtained by the image capturing unit;
controlling, responsive to a determination that the image capturing apparatus is in the mode to perform shooting in the state in which the optical axis of the optical system faces the photographer side, the recording unit to record rectangular image data obtained by the image capturing unit.

10. An image capturing apparatus comprising:
an optical system configured to form an image of a light beam from an object;
an image capturing unit configured to obtain image data corresponding to the light beam by the optical system;
a posture detection unit configured to detect a posture of the image capturing apparatus;
a control unit configured to determine based on the posture whether the image capturing apparatus is in a mode to perform shooting in a state in which an optical axis of the optical system faces a zenith or in a mode to perform shooting in a state in which the optical axis of the optical system faces a photographer side, and change control in a shooting operation using the image capturing unit in accordance with a result of the determination;
a first electronic flash having a light-emitting direction parallel to the optical axis of the optical system; and
a second electronic flash having a light-emitting direction perpendicular to the optical axis of the optical system,
wherein upon determining that the image capturing apparatus is in the mode to perform shooting in the state in which the optical axis of the optical system faces the zenith and light emission of the electronic flash is necessary, the control unit causes the second electronic flash to emit light, and upon determining that the image capturing apparatus is in the mode to perform shooting in the state in which the optical axis of the optical system faces the photographer side and light emission of the electronic flash is necessary, the control unit causes the first electronic flash to emit light.

11. An image capturing apparatus comprising:
an optical system configured to form an image of a light beam from an object;
an image capturing unit configured to obtain image data corresponding to the light beam by the optical system;
a posture detection unit configured to detect a posture of the image capturing apparatus;
a control unit configured to determine based on the posture whether the image capturing apparatus is in a mode to perform shooting in a state in which an optical axis of the optical system faces a zenith or in a mode to perform shooting in a state in which the optical axis of the optical system faces a photographer side, and change control in a shooting operation using the image capturing unit in accordance with a result of the determination; and
a touch panel,
wherein upon determining that the image capturing apparatus is in the mode to perform shooting in the state in which the optical axis of the optical system faces the photographer side and a touch portion detected on the touch panel is a predetermined position, the control unit changes a setting of the touch panel so as to execute the shooting in accordance with a manipulation on the touch panel.

12. An image capturing apparatus comprising:
an optical system configured to form an image of a light beam from an object, wherein the optical system includes a first optical system, and a second optical system having a field wider than in the first optical system;
an image capturing unit configured to obtain image data corresponding to the light beam by the optical system, wherein the image capturing unit includes a first image capturing unit corresponding to the first optical system, and a second image capturing unit corresponding to the second optical system;
a posture detection unit configured to detect a posture of the image capturing apparatus; and
a control unit configured to determine based on the posture whether the image capturing apparatus is in a mode to perform shooting in a state in which an optical axis of the optical system faces a zenith or in a mode to perform shooting in a state in which the optical axis of the optical system faces a photographer side, and change control in a shooting operation using the image capturing unit in accordance with a result of the determination.

* * * * *